(12) United States Patent
Hiraide

(10) Patent No.: US 8,482,820 B2
(45) Date of Patent: Jul. 9, 2013

(54) IMAGE-CAPTURING SYSTEM

(75) Inventor: Shuzo Hiraide, Tokyo (JP)

(73) Assignee: Olympus Corporation, Tokyo (JP)

( * ) Notice: Subject to any disclaimer, the term of this patent is extended or adjusted under 35 U.S.C. 154(b) by 456 days.

(21) Appl. No.: 12/903,602

(22) Filed: Oct. 13, 2010

(65) Prior Publication Data

US 2011/0085215 A1    Apr. 14, 2011

(30) Foreign Application Priority Data

Oct. 13, 2009   (JP) .............................. P2009-236419

(51) Int. Cl.
*H04N 1/04* (2006.01)
(52) U.S. Cl.
USPC .......................... 358/486; 358/488; 358/496

(58) Field of Classification Search
None
See application file for complete search history.

(56) References Cited

U.S. PATENT DOCUMENTS

| | | | |
|---|---|---|---|
| 7,248,732 B2 * | 7/2007 | Kuwabara | 382/149 |
| 7,330,265 B2 * | 2/2008 | Kurosawa et al. | 356/445 |
| 2008/0165416 A1 * | 7/2008 | Ariga et al. | 359/393 |

* cited by examiner

*Primary Examiner* — Douglas Tran
(74) *Attorney, Agent, or Firm* — Westerman, Hattori, Daniels & Adrian, LLP

(57) ABSTRACT

An image-capturing system includes: a stage that has mounted and fixed thereon a glass slide on which at least one sample is placed and that circulates in an endless-track shape; a line sensor that scans only a part of the sample; an imaging driving mechanism that moves a relative position of the line sensor and the stage in a direction perpendicular to a scanning direction of the line sensor; and an optical system that focuses an image of the sample on the line sensor.

7 Claims, 19 Drawing Sheets

IMAGE-CAPTURING SYSTEM

BACKGROUND OF THE INVENTION

1. Field of the Invention

The present invention relates to an image-capturing system.

Priority is claimed on Japanese Patent Application No. 2009-236419, filed on Oct. 13, 2009, the content of which is incorporated herein by reference.

2. Description of Related Art

Recently, virtual microscopes have become well known in the field of pathology such as in cell and tissue diagnosis. The virtual microscopes can capture an image of the entire glass slide on which a sample is placed, digitalize the captured image, display the digitalized image on a monitor of a personal computer, and operate as if the sample were observed with an actual microscope.

In a microscope system acquiring image data to be used in the virtual microscope, it is required to acquire the image data with a high resolution and at a high speed. Therefore, a microscope system using a one-dimensional scanner camera with an imaging device in which plural pixels are arranged in one dimension is proposed (for example, see PCT Japanese Translation Patent Publication No. 2004-514920).

In such a microscope system, a glass slide mounted on a stage and having a sample placed thereon is moved in a horizontal direction, whereby image data of the glass slide is acquired with a one-dimensional scanner camera. In this case, since the image data in the X-axis direction (a sub scanning direction of a line sensor built into the one-dimensional scanner camera) of the glass slide corresponding to a visual field of observation of the one-dimensional scanner camera can be acquired by scanning, the image data of the glass slide can be consequently acquired at a high speed.

A specific example where a glass slide is scanned to acquire image data of the glass slide by the use of the one-dimensional scanner camera in the microscope system will be described below. FIG. 23 is a diagram illustrating the configuration of a microscope system using a one-dimensional scanner camera.

The microscope system includes a light source 1102, a stage 1103, a driving device 1104, a line sensor 1105, and an optical system 1106. A glass slide 1101 is mounted on the stage 1103.

A sample is placed on the glass slide 1101. The light source 1102 illuminates the glass slide 1101. In the example shown in FIG. 23, the glass slide 1101 is transmissively illuminated by the light source 1102. The driving device 1104 moves the stage 1103 in the horizontal direction, that is, moves the stage 1103 in the XY direction. The line sensor 1105 is constructed by an imaging device receiving light from the glass slide 1101 and converting the received light into an electrical signal. The optical system 1106 includes plural lenses and enlarges and focuses an image of the glass slide 1101 on a face of the line sensor 1105. Therefore, the light from the glass slide 1101 is input to the line sensor 1105 through the optical system 1106.

FIG. 24 shows a trace of a visual field of observation of the line sensor 1105 when the line sensor 1105 acquires image data of the glass slide 1101. By moving the stage 1103 in the horizontal direction, an area 1205 (the visual field of the observation) from which the image data is acquired by the line sensor 1105 is also moved. In an initial state, the driving device 1104 moves the stage 1103 so that the line sensor 1105 is located at a position for acquiring the image data of a left-upper area 1206. In FIG. 24, the direction from the left side to the right side which is the sub scanning direction of the line sensor 1105 is defined as the X-axis direction. The direction from the lower side to the upper side which is the main scanning direction of the line sensor 1105 is defined as the Y-axis direction. The direction perpendicular to FIG. 24 is defined as the Z-axis direction.

Initially, the driving device 1104 moves the stage 1103 in an X1 direction parallel to the X-axis direction. Accordingly, the line sensor 1105 performs the scanning as indicated by arrow a. Therefore, the microscope system acquires the image data of an area 1201-1. Subsequently, the driving device 1104 moves the stage 1103 in an Y1 direction parallel to the Y-axis direction by a distance in the longitudinal direction (the main scanning direction) of the line sensor 1105 or a distance smaller than the distance in the longitudinal direction of the line sensor 1105. Subsequently, the driving device 1104 moves the stage 1103 in an X2 direction parallel to the X-axis direction. Accordingly, the line sensor 1105 performs the scanning as indicated by arrow b. Therefore, the microscope system acquires the image data of an area 1201-2.

The microscope system repeatedly performs the above-mentioned operation. That is, the line sensor 1105 performs the scanning operation in the order of arrows a, b, c, . . . , and n shown in FIG. 24, whereby the microscope system acquires partial image data of areas 1201-1 to 1201-n of the glass slide 1101. The microscope system acquires the entire image data of the glass slide 1101 by synthesizing the acquired partial image data of the areas 1201-1 to 1201-n.

SUMMARY OF THE INVENTION

An advantage of some aspects of the invention is to provide an image-capturing system which can suppress an error in an image-capturing position due to a driving state of a stage.

According to an aspect of the invention, there is provided an image-capturing system including: a stage that has mounted and fixed thereon a glass slide on which at least one sample is placed and that circulates in an endless-track shape; a line sensor that scans only a part of the sample; a moving mechanism that moves a relative position of the line sensor and the stage in a direction perpendicular to a scanning direction of the line sensor; and an optical system that focuses an image of the sample on the line sensor.

In the image-capturing system, the stage may have a plurality of the glass slides mounted and fixed thereon.

In the image-capturing system, the stage may have a plurality of lines of the glass slides mounted and fixed thereon in the scanning direction of the line sensor.

The image-capturing system may further include a structure having information on the time for moving a relative position of the line sensor and the stage.

The image-capturing system may further include an image processing unit that acquires the information on the time for moving the relative position of the line sensor and the stage from image data obtained by causing the line sensor to capture an image of the structure having the information on the time.

The image-capturing system may further include a sensor that acquires the information on the time for moving the relative position of the line sensor and the stage from the structure having the information on the time.

The image-capturing system may further include: a structure having information on an area of the stage which is not scanned by the line sensor; and an image processing unit that acquires the information on the area of the stage which is not scanned by the line sensor from image data obtained by causing the line sensor to capture an image of the structure having the information on the area of the stage which is not scanned by the line sensor. Here, the circulation speed of the stage may be enhanced when the line sensor passes through the area of the stage which is not scanned by the line sensor.

DETAILED DESCRIPTION OF THE INVENTION

First Embodiment

Figure 1:
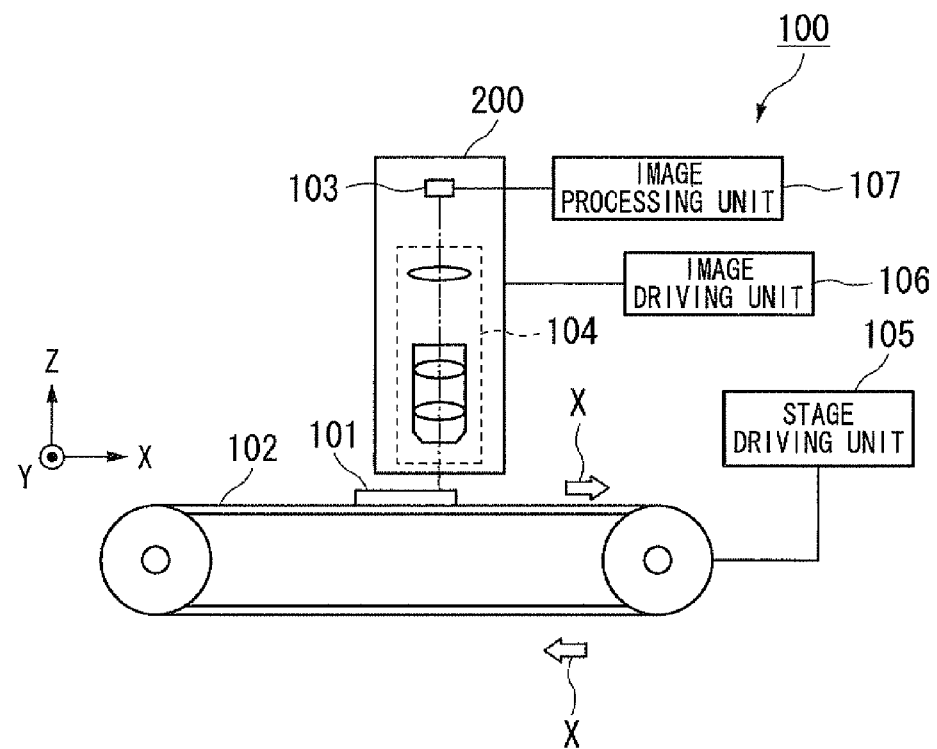
FIG. 1 is a diagram schematically illustrating the configuration of an image-capturing system according to a first embodiment of the invention.

Hereinafter a first embodiment of the invention will be described with reference to the drawings. FIG. 1 is a diagram schematically illustrating the configuration of an image-capturing system according to this embodiment. This drawing is a schematic diagram of the image-capturing system as viewed from a lateral side. In the example shown in FIG. 1, a light-emitting system illuminating a glass slide is not shown.

In the example shown in FIG. 1, an image-capturing system 100 includes a stage 102, a stage driving unit 105, an imaging driving unit 106 (moving mechanism), an image processing unit 107, and an imaging unit 200. The imaging unit 200 includes a line sensor 103 and an optical system 104. A single glass slide 101 is mounted on the stage 102. The glass slide 101 is fixed to the stage 102. A sub scanning direction of the line sensor 103 is the X-axis direction. A main scanning direction of the line sensor 103 is the Y-axis direction. In FIG. 1, the direction from the left side to the right side of FIG. 1 is defined as the X-axis direction. The direction perpendicular to FIG. 1 is defined as the Y-axis direction. The direction from the lower side to the upper side of FIG. 1 is defined as the Z-axis direction.

A sample is placed on the glass slide 101. The stage 102 has an endless-track shape and always circulates in a constant direction. In the example shown in FIG. 1, the stage 102 has a conveyer-belt shape and circulates in the direction of arrow X parallel to the X-axis direction. The stage driving unit 105 causes the stage 102 to always circulate in a constant direction. The imaging driving unit 106 drives the imaging unit 200 in the direction parallel to the Y-axis direction and the direction parallel to the Z-axis direction.

The line sensor 103 includes a light-receiving element arranged in a line. The light-receiving elements receive light from the glass slide 101 and convert the received light into an electrical signal. The optical system 104 includes plural lenses, magnifies the image of the glass slide 101, and focuses the magnified image on the face of the line sensor 103. Accordingly, the light from the glass slide 101 is input to the line sensor 103 through the optical system 104.

The image processing unit 107 generates image data on the basis of the electrical signal which is converted from the received light by the line sensor 103.

Figure 2:
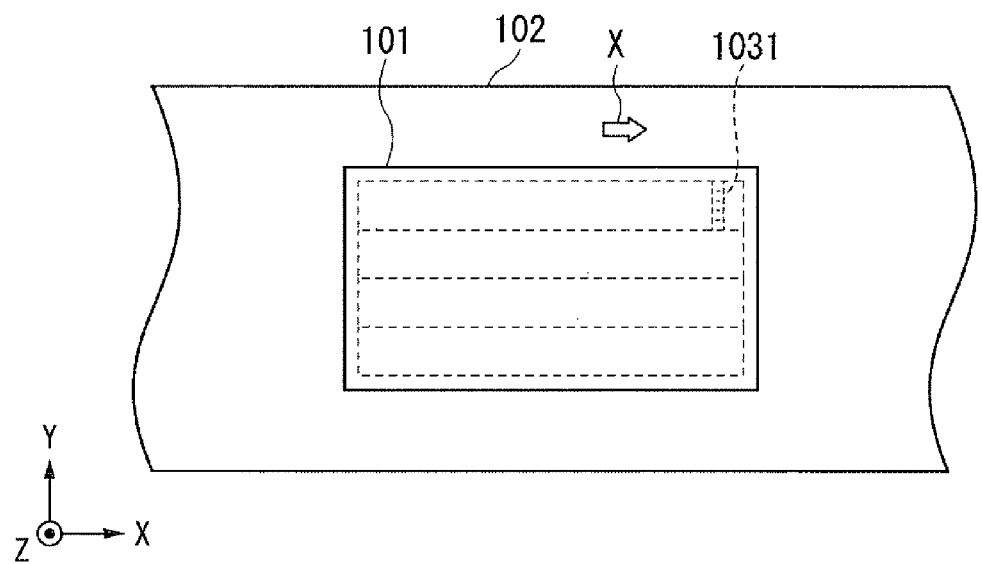
FIG. 2 is a diagram schematically illustrating a stage as viewed from the top side of the image-capturing system according to the first embodiment of the invention.

The arrangement of the glass slide 101 will be described. FIG. 2 is a diagram schematically illustrating the glass slide 101 mounted on the stage 102 according to this embodiment as viewed from the upside of the image-capturing system 100.

In the example shown in FIG. 2, one glass slide 101 is mounted and fixed on the stage 102. FIG. 2 shows a visual field of observation 1031 of the line sensor 103 as an area from which the image data is acquired by the line sensor 103.

In FIG. 2, the X-axis direction which is the sub scanning direction of the line sensor 103 is the direction from the left side to the right side of FIG. 2. The Y-axis direction which is the main scanning direction of the line sensor 103 is the direction from the lower side to the upper side of FIG. 2. The direction perpendicular to FIG. 2 is defined as the Z-axis direction.

Areas of partial images captured by the image-capturing system 100 according to this embodiment and an area of the entire image thereof will be described. The entire image is an image of the entire glass slide 101. A partial image is an image of an area, which can be captured by means of scanning of the line sensor 103 once, out of the entire image.

Figure 3:
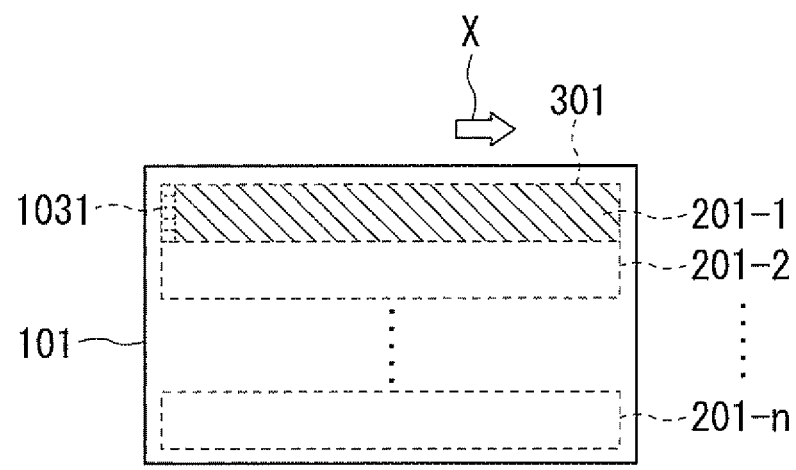
FIG. 3 is a diagram schematically illustrating an area of a first partial image captured by the image-capturing system according to the first embodiment of the invention.

FIG. 3 is a diagram schematically illustrating the area of a first partial image 201-1 acquired by the image-capturing system 100 after the line sensor 103 performs a first scanning operation to be described later in this embodiment. In FIG. 3, the glass slide 101, the visual field of observation 1031 of the line sensor 103, and first to n-th partial images 201-1 to 201-n of the glass slide 101 are shown. The area of the first partial image 201-1 acquired by the image-capturing system 100 after the line sensor 103 performs the first scanning operation to be described later is indicated as a hatched area 301.

Figure 4:
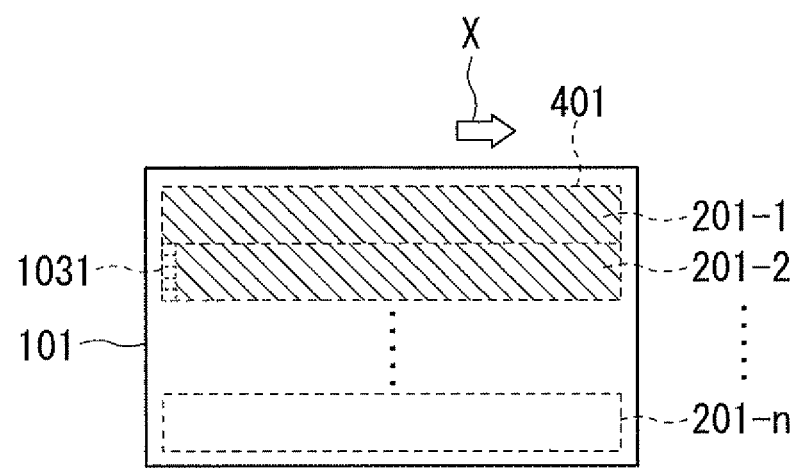
FIG. 4 is a diagram schematically illustrating areas of first and second partial images captured by the image-capturing system according to the first embodiment of the invention.

FIG. 4 is a diagram schematically illustrating the areas of first and second partial images 201-1 and 201-2 acquired by the image-capturing system 100 after the line sensor 103 performs a second scanning operation to be described later in this embodiment. In FIG. 4, the glass slide 101, the visual field of observation 1031 of the line sensor 103, and the first to n-th partial images 201-1 to 201-n of the glass slide 101 are shown. The areas of the first and second partial images 201-1 and 201-2 acquired by the image-capturing system 100 after the line sensor 103 performs the second scanning operation to be described later are indicated as a hatched area 401.

Figure 5:
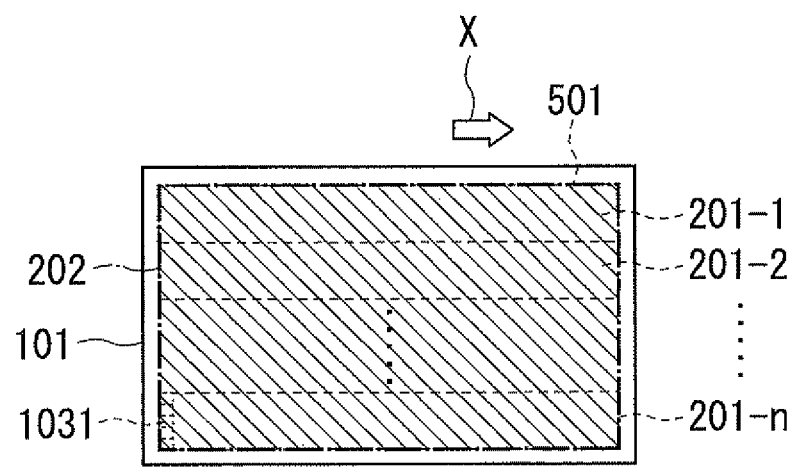
FIG. 5 is a diagram schematically illustrating areas of first to n-th partial images captured by the image-capturing system according to the first embodiment of the invention.

FIG. 5 is a diagram schematically illustrating the areas of the first to n-th partial images 201-1 to 201-n acquired by the image-capturing system 100 after the line sensor 103 performs an n-th scanning operation to be described later in this embodiment. In FIG. 5, the glass slide 101, the visual field of observation 1031 of the line sensor 103, and the first to n-th partial images 201-1 to 201-n of the glass slide 101 are shown. The areas of the first to n-th partial images 201-1 to 201-n acquired by the image-capturing system 100 after the line sensor 103 performs the n-th scanning operation to be described later are indicated as a hatched area 501.

The operation of the image-capturing system 100 according to this embodiment will be described. First, the stage driving unit 105 drives the stage 102 having an endless-track shape in a constant direction (the direction of arrow X in FIGS. 1 and 2) until the driving speed of the stage reaches an image reading speed which is the speed at which the line sensor 103 scans the glass slide 101.

When the driving speed of the stage 102 reaches the image reading speed and the driving speed is stabilized, the imaging driving unit 106 moves the imaging unit 200 in the main scanning direction (Y-axis direction) of the line sensor 103 so that the visual field of observation 1031 of the line sensor 103 is located at the position for reading the area of the first partial image 201-1 shown in FIG. 3.

Subsequently, the line sensor 103 scans (first scanning operation) the area of the first partial image 201-1 and converts the received light into an electrical signal. Then, the image processing unit 107 generates image data of the rectangular first partial image 201-1 on the basis of the electrical signal output from the line sensor 103. Accordingly, after performing the first scanning operation, the image-capturing system 100 acquires the image data of the first partial image 201-1 (the hatched area 301 in FIG. 3).

When the image data of the first partial image 201-1 is completely acquired, the imaging driving unit 106 moves the imaging unit 200 in the main scanning direction (the Y-axis direction) of the line sensor 103 so that the visual field of observation 1031 of the line sensor 103 is located at the position for reading the area of the second partial image 201-2 shown in FIG. 4, and prepares to capture the image of the next imaging area of the glass slide 101, that is, the image of the second partial image 201-2.

When the stage 102 having an endless-track shape circulates and the visual field of observation 1031 of the line sensor 103 reaches the area of the second partial image 201-2 which is the next imaging area of the glass slide 101, the line sensor 103 scans (second scanning operation) the area of the second partial image 201-2 and converts the received light into an electrical signal. Subsequently, the image processing unit 107 generates image data of the rectangular second partial image 201-2 on the basis of the electrical signal output from the line sensor 103. Accordingly, after performing the second scanning operation, the image-capturing system 100 acquires the image data of the first partial image 201-1 and the second partial image 201-2 (the hatched area 401 in FIG. 4).

The image-capturing system 100 performs n scanning operations by repeating the above-mentioned operation. Accordingly, after performing the n-th scanning operation, the image-capturing system 100 acquires the image data of the first to n-th partial images 201-1 to 201-n (the hatched area 501 in FIG. 5).

Subsequently, the image processing unit 107 synthesizes the image data of the acquired first to n-th partial images 201-1 to 201-n and generates the image data of the entire image 202 of the glass slide 101. Accordingly, the image-capturing system 100 acquires the image data of the entire image 202 of the glass slide 101.

As described above, the image-capturing system 100 according to this embodiment includes the stage 102 having an endless-track shape and stably drives the stage 102 circulating in the endless-track shape in a constant direction without stopping. The image-capturing system 100 scans the glass slide 101 moved by the stage 102 and acquires the image data of the first to n-th partial images 201-1 to 201-n.

Therefore, whenever acquiring the image data of the first to n-th partial images 201-1 to 201-n, the image-capturing system 100 does not have to stop the moving stage 102 or to accelerate the stopped stage 102. Accordingly, a backlash of a stage carrying system such as the stage driving unit 105 does not occur. Therefore, the image-capturing system 100 acquires the image data of the first to n-th partial images 201-1 to 201-n with high precision without being affected by an error of the stage carrying system, synthesizes the acquired image data of the first to n-th partial images 201-1 to 201-n, and acquires the image data of the entire image 202.

Second Embodiment

A second embodiment of the invention will be described below. This embodiment is different from the first embodiment, in that plural glass slides 101-1 to 101-m are arranged, mounted, and fixed on the stage 102 circulating in an endless-track shape in a line in the circulating direction of the stage 102, that is, in the sub scanning direction of the line sensor 103.

Figure 6:
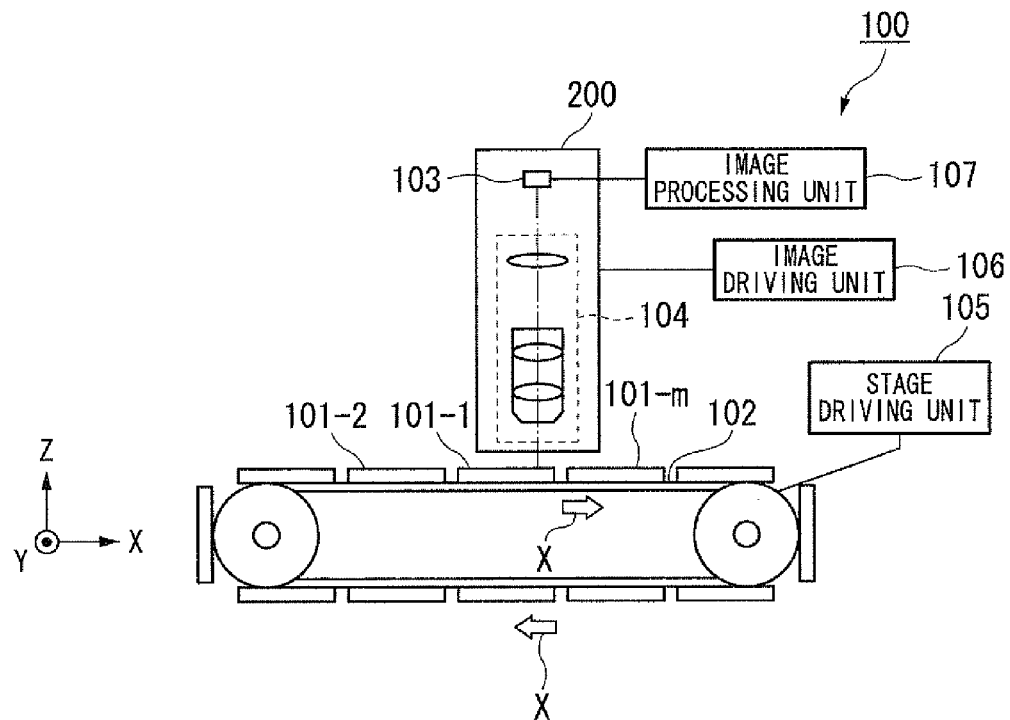
FIG. 6 is a diagram schematically illustrating the configuration of an image-capturing system according to a second embodiment of the invention.

FIG. 6 is a diagram schematically illustrating the configuration of the image capturing system 100 according to this embodiment. This drawing shows a side view of the image-capturing system 100. The configuration of the image-capturing system 100 according to this embodiment is the same as the configuration of the image-capturing system 100 according to the first embodiment. In FIG. 6, the same elements as shown in FIG. 1 are referenced by the same reference numerals as shown in FIG. 1. In the example shown in FIG. 6, unlike the example shown in FIG. 1, m glass slides 101-1 to 101-$m$ are mounted on the stage 102.

Figure 7:
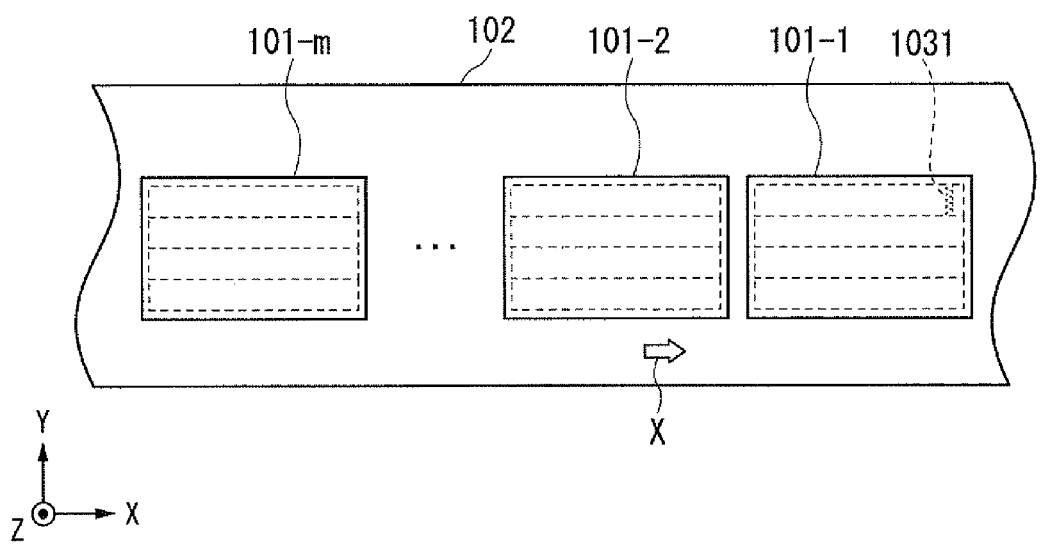
FIG. 7 is a diagram schematically illustrating a stage as viewed from the top side of the image-capturing system according to the second embodiment of the invention.

The arrangement of the glass slides 101-1 to 101-$m$ will be described. FIG. 7 is a diagram schematically illustrating the glass slides 101-1 to 101-$m$ mounted on the stage 102 according to this embodiment as viewed from the upside of the image-capturing system 100. In the example shown in FIG. 7, the glass slides 101-1 to 101-$m$ are mounted on the stage 102. This drawing shows a visual field of observation 1031 of the line sensor 103 as an area from which the image data is acquired from the line sensor 103.

In FIG. 7, the X-axis direction which is the sub scanning direction of the line sensor 103 is the direction from the left side to the right side of FIG. 7. The Y-axis direction which is the main scanning direction of the line sensor 103 is the direction from the lower side to the upper side of FIG. 7. The direction perpendicular to FIG. 7 is defined as the Z-axis direction.

Figure 8:
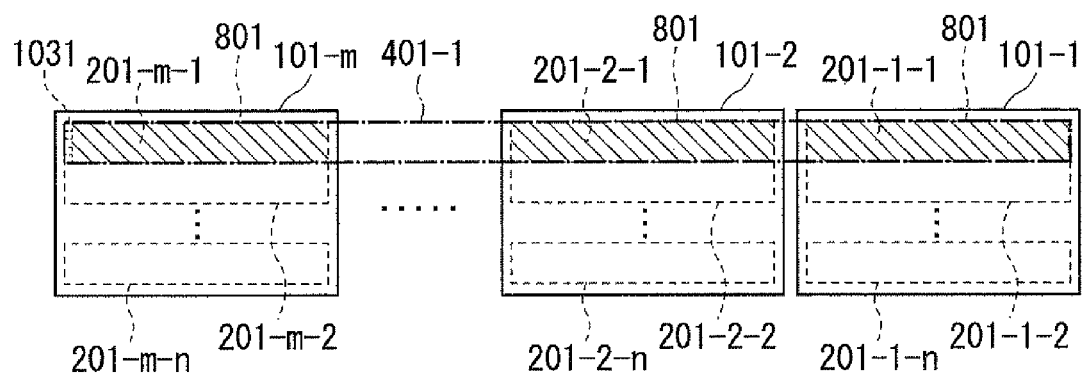
FIG. 8 is a diagram schematically illustrating an area of a first partial image captured by the image-capturing system according to the second embodiment of the invention.

Areas of partial images captured by the image-capturing system 100 according to this embodiment and an area of the entire image thereof will be described. FIG. 8 is a diagram schematically illustrating the areas of first partial images 201-1-1 to 201-$m$-1 of the glass slides 101-1 to 101-$m$ acquired by the image-capturing system 100 after the line sensor 103 performs a first scanning operation to be described later in this embodiment. In FIG. 8, the glass slides 101-1 to 101-$m$, the visual field of observation 1031 of the line sensor 103, first to n-th partial images 201-1-1 to 201-$m$-$n$ of the respective glass slides 101-1 to 101-$m$, and a first partial image group 401-1 of the glass slides 101-1 to 101-$m$ are shown. The first partial images 201-1-1 to 201-$m$-1 of the glass slides form the first partial image group 401-1. In FIG. 8, the areas of the first partial images 201-1-1 to 201-$m$-1 of the glass slides 101-1 to 101-$m$ acquired by the image-capturing system 100 after the line sensor 103 performs the first scanning operation to be described later are indicated as a hatched area 801.

Figure 9:
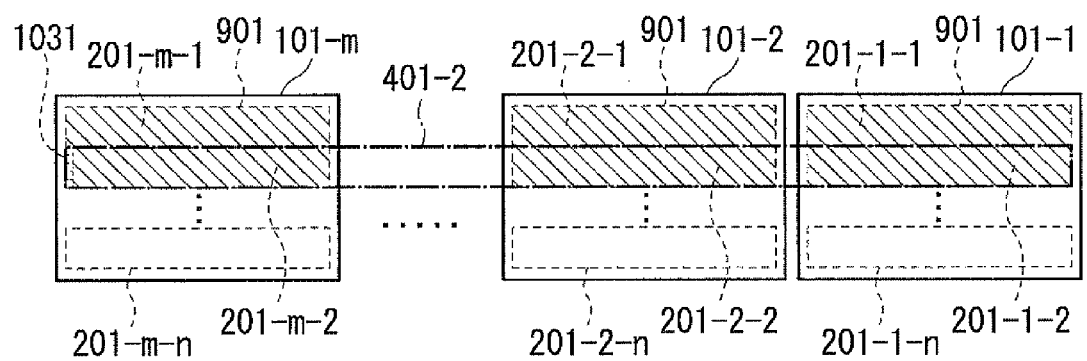
FIG. 9 is a diagram schematically illustrating areas of first and second partial images captured by the image-capturing system according to the second embodiment of the invention.

FIG. 9 is a diagram schematically illustrating the areas of first and second partial images 201-1-1 to 201-$m$-2 of the glass slides 101-1 to 101-$m$ acquired by the image-capturing system 100 after the line sensor 103 performs a second scanning operation to be described later in this embodiment. In FIG. 9, the glass slides 101-1 to 101-$m$, the visual field of observation 1031 of the line sensor 103, first to n-th partial images 201-1-1 to 201-$m$-$n$ of the respective glass slides 101-1 to 101-$m$, and a second partial image group 401-2 of the glass slides 101-1 to 101-$m$ are shown. The second partial images 201-1-2 to 201-$m$-2 of the glass slides form the second partial image group 401-2. In FIG. 9, the areas of the first and second partial images 201-1-1 to 201-$m$-2 of the glass slides 101-1 to 101-$m$ acquired by the image-capturing system 100 after the line sensor 103 performs the second scanning operation to be described later are indicated as a hatched area 901.

Figure 10:
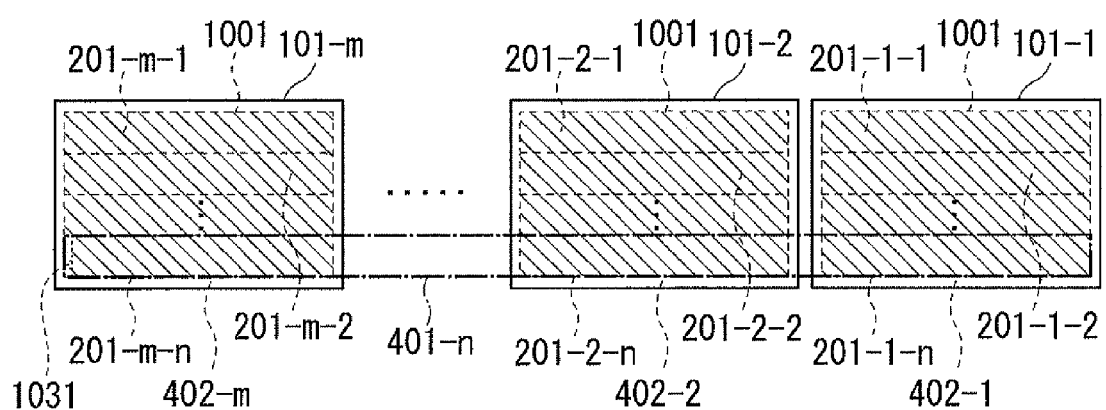
FIG. 10 is a diagram schematically illustrating areas of first to n-th partial images captured by the image-capturing system according to the second embodiment of the invention.

FIG. 10 is a diagram schematically illustrating the areas of first to n-th partial images 201-1-1 to 201-$m$-$n$ of the glass slides 101-1 to 101-$m$ acquired by the image-capturing system 100 after the line sensor 103 performs an n-th scanning operation to be described later in this embodiment. In FIG. 10, the glass slides 101-1 to 101-$m$, the visual field of observation 1031 of the line sensor 103, first to n-th partial images 201-1-1 to 201-$m$-$n$ of the respective glass slides 101-1 to 101-$m$, entire images 402-1 to 402-$m$ of the glass slides 101-1 to 101-$m$, and an n-th partial image group 401-$n$ of the glass slides 101-1 to 101-$m$ are shown. The n-th partial images 201-1-$n$ to 201-$m$-$n$ of the glass slides form the n-th partial image group 401-$n$. In FIG. 10, the areas of the first to n-th partial images 201-1-1 to 201-$m$-$n$ of the glass slides 101-1 to 101-$m$ acquired by the image-capturing system 100 after the line sensor 103 performs the n-th scanning operation to be described later are indicated as a hatched area 1001.

The operation of the image-capturing system 100 according to this embodiment will be described. First, the stage driving unit 105 drives the stage 102 having an endless-track shape in a constant direction (the direction of arrow X in FIGS. 6 and 7) until the driving speed of the stage reaches an image reading speed which is the speed at which the line sensor 103 scans the glass slides 101-1 to 101-$m$.

When the driving speed of the stage 102 reaches the image reading speed and the driving speed is stabilized, the imaging driving unit 106 moves the imaging unit 200 in the main scanning direction (Y-axis direction) of the line sensor 103 so that the visual field of observation 1031 of the line sensor 103 is located at the position for reading the area of the first partial image group 401-1 shown in FIG. 8.

Subsequently, the line sensor 103 scans (first scanning operation) the area of the first partial image group 401-1 including the first partial images 202-1-1 to 201-$m$-1 of the glass slides and converts the received light into an electrical signal. Then, the image processing unit 107 generates image data of the first partial image group 401-1 on the basis of the electrical signal output from the line sensor 103. Accordingly, after performing the first scanning operation, the image-capturing system 100 acquires the image data of the first partial image group 401-1 (the hatched area 801 in FIG. 8).

When the image data of the first partial image group 401-1 is completely acquired, the imaging driving unit 106 moves the imaging unit 200 in the main scanning direction (the Y-axis direction) of the line sensor 103 so that the visual field of observation 1031 of the line sensor 103 is located at the position for reading the area of the second partial image group 401-2 shown in FIG. 9, and prepares to capture the image of the next imaging area of the glass slide 101, that is, the image of the second partial image group 401-2.

When the stage 102 having an endless-track shape circulates and the visual field of observation 1031 of the line sensor 103 reaches the area of the second partial image group 401-2 which is the next imaging area of the glass slide 101-1, the line sensor 103 scans (performs a second scanning operation) the area of the second partial image group 401-2 including the second partial images 201-1-2 to 201-$m$-2 of the glass slides and converts the received light into an electrical signal. Subsequently, the image processing unit 107 generates the image data of the second partial image group 401-2 on the basis of the electrical signal output from the line sensor 103. Accordingly, after performing the second scanning operation, the image-capturing system 100 acquires the image data of the first partial image group 401-1 and the second partial image group 401-2 (the hatched area 901 in FIG. 9).

The image-capturing system 100 performs n scanning operations by repeating the above-mentioned operation. Accordingly, after performing the n-th scanning operation, the image-capturing system 100 acquires the image data of the first to n-th partial image groups 401-1 to 401-$n$ (the hatched area 1001 in FIG. 10).

The image processing unit 107 divides the acquired image data of the first to n-th partial image groups 401-1 to 401-$n$ into the glass slides 101-1 to 101-$m$ and generates the image data of the first to n-th partial images 201-1-1 to 201-*m*-*n*. For example, the method of dividing the image data of the first to n-th partial image groups 401-1 to 401-*n* employs a dividing method using both ends of the image data of the stage 102 included in the image data of the first to n-th partial image groups 401-1 to 401-*n*. The method of dividing the image data of the first to n-th partial image groups 401-1 to 401-*n* may employ any method.

The image processing unit 107 synthesizes the generated image data of the first to n-th partial images 201-1-1 to 201-*m*-*n* for each of the glass slides 101-1 to 101-*m* and generates the image data of the entire images 402-1 to 402-*m* of the glass slides 101-1 to 101-*m*.

For example, the image processing unit 107 synthesizes the image data of the first to n-th partial images 201-1-1 to 201-1-*n* of the glass slide 101-1 and generates the image data of the entire image 402-1 of the glass slide 101-1. The image processing unit 107 generates the image data of the entire images 402-2 to 402-*m* of the other glass slides 101-2 to 101-*m* in the same way.

Accordingly, the image-capturing system 100 acquires the image data of the entire images 402-1 to 402-*m* of the glass slides 101-1 to 101-*m*.

As described above, the image-capturing system 100 according to this embodiment includes the stage 102 having an endless-track shape and stably drives the stage 102 circulating in the endless-track shape in a constant direction without stopping. The image-capturing system 100 scans the glass slides 101-1 to 101-*m* moved by the stage 102 and acquires the image data of the first to n-th partial images 201-1-1 to 201-*m*-*n* of the glass slides.

Therefore, when acquiring the image data of the first to n-th partial images 201-1-1 to 201-1-*n* of the glass slides, it is not necessary to repeat stopping of the moving stage or the acceleration of the stopped stage. Accordingly, a backlash of a stage carrying system such as the stage driving unit 105 does not occur. Therefore, the image-capturing system 100 acquires the image data of the first to n-th partial images 201-1-1 to 201-*m*-*n* of the glass slides with high precision without being affected by an error of the stage carrying system, synthesizes the acquired image data of the first to n-th partial images 201-1-1 to 201-*m*-*n*, and acquires the image data of the entire images 402-1 to 402-*m*.

In this embodiment, plural glass slides 101-1 to 101-*m* are arranged and mounted in a line in the circulating direction of the stage 102, that is, the sub scanning direction of the line sensor 103. Accordingly, the image-capturing system 100 can acquire the image data of the first to n-th partial image groups 401-1 to 401-*n* without moving the visual field of the line sensor 103 to a scanning position for each of the glass slides 101-1 to 101-*m* at the time of scanning the glass slides 101-1 to 101-*m*. Accordingly, the image-capturing system 100 can acquire the entire image data of the glass slides 101-1 to 101-*m* with high throughput.

Third Embodiment

A third embodiment of the invention will be described below. This embodiment is different from the second embodiment, in that plural glass slides 101-(1,1) to 101-(1,m) are arranged, mounted, and fixed on the stage 102 circulating in an endless-track shape in plural lines in the circulating direction of the stage 102, that is, in the sub scanning direction of the line sensor 103. The configuration of the image-capturing system 100 according to this embodiment is the same as the configuration of the image-capturing system 100 according to the second embodiment.

Figure 11:
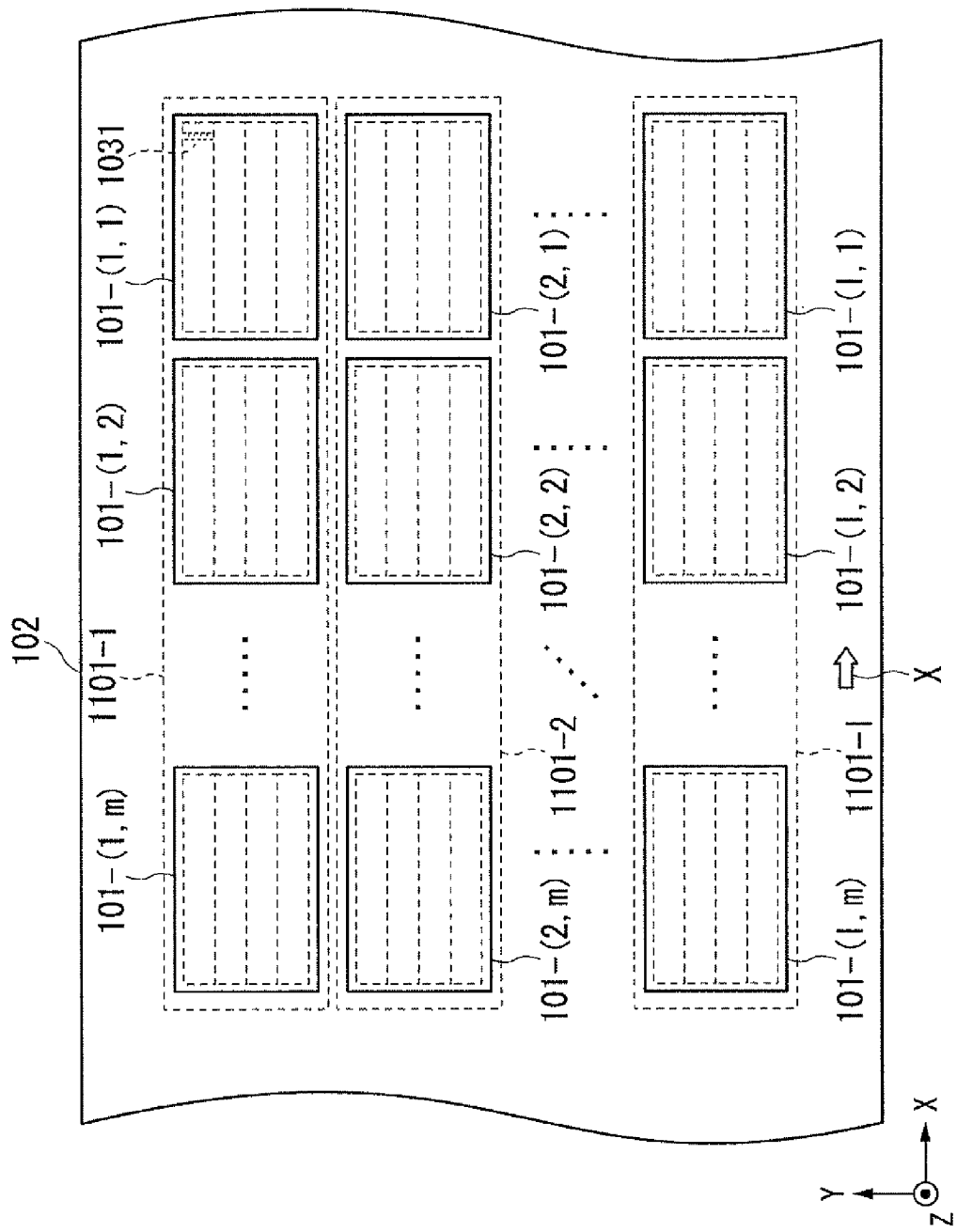
FIG. 11 is a diagram schematically illustrating a stage as viewed from the top side of the image-capturing system according to a third embodiment of the invention.

The arrangement of the glass slides 101-(1,1) to 101-(1,m) will be described. FIG. 11 is a diagram schematically illustrating the glass slides 101-(1,1) to 101-(1,m) mounted on the stage 102 according to this embodiment as viewed from the upside of the image-capturing system 100.

In the example shown in FIG. 11, the glass slides 101-(1,1) to 101-(1,m) are mounted on the stage 102 in a state where they are arranged in m lines in the sub scanning direction of the line sensor 103 (in the X-axis direction in FIG. 11) and are arranged in a line in the main scanning direction of the line sensor 103 (in the Y-axis direction in FIG. 11). That is, (m×l) glass slides 101-(1,1) to 101-(1,m) are mounted on the stage 102. FIG. 11 shows a visual field of observation 1031 of the line sensor 103 as an area from which the image data is acquired by the line sensor 103.

The glass slides 101-(1,1) to 101-(1,m) are defined as forming a first slide group 1101-1. The glass slides 101-(2,1) to 101-(2,m) are defined as forming a second slide group 1101-2. The other glass slides 101-(3,1) to 101-(1,m) are defined as forming third to l-th slide groups 1101-3 to 1101-1.

In FIG. 11, the X-axis direction which is the sub scanning direction of the line sensor 103 is the direction from the left side to the right side of FIG. 11. The Y-axis direction which is the main scanning direction of the line sensor 103 is the direction from the lower side to the upper side of FIG. 11. The direction perpendicular to FIG. 11 is defined as the Z-axis direction.

Figure 12:
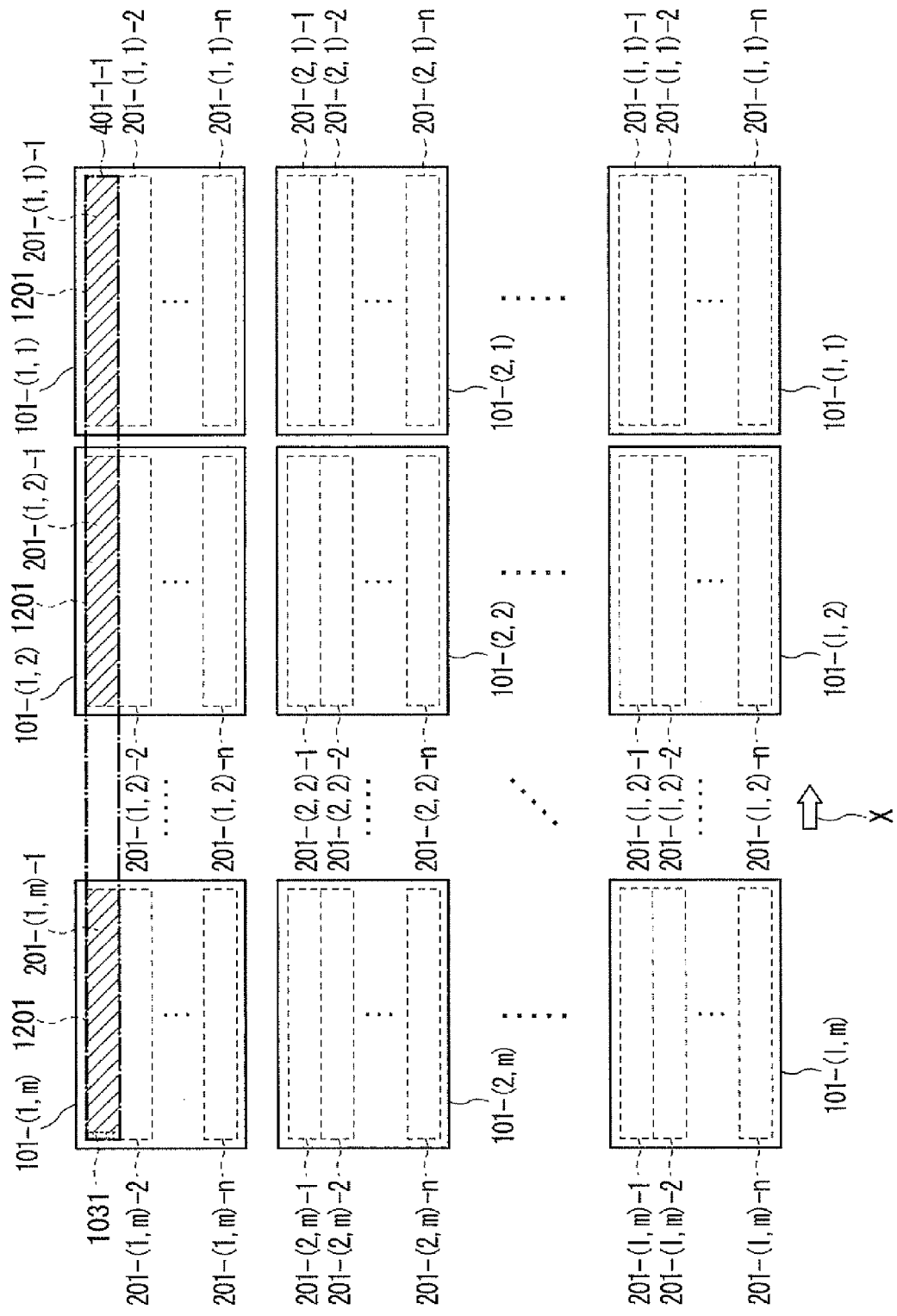
FIG. 12 is a diagram schematically illustrating areas of first partial images of a first slide group captured by the image-capturing system according to the third embodiment of the invention.

The areas of the partial images captured by the image-capturing system 100 according to this embodiment and the areas of the entire images thereof will be described below. FIG. 12 is a diagram illustrating the areas of the first partial images 201-(1,1)-1 to 201-(1,m)-1 of the glass slides 101-(1,1) to 101-(1,m) of the first slide group 1101-1 acquired by the image-capturing system 100 after the line sensor 103 performs a first scanning operation to be described later in this embodiment. In FIG. 12, the glass slides 101-(1,1) to 101-(1,m), the visual field of observation 1031 of the line sensor 103, first to n-th partial images 201-(1,1)-1 to 201-(1,m)-n of the glass slides 101-(1,1) to 101-(1,m), and a first partial image group 401-1-1 of the first slide group 1101-1 are shown. The first partial images 201-(1,1)-1 to 201-(1,m)-1 of the glass slides are defined as forming the first partial image group 401-1-1 of the first slide group 1101-1. In FIG. 12, the areas of the first partial images 201-(1,1)-1 to 201-(1,m)-1 of the first slide group 1101-1 acquired by the image-capturing system 100 after the line sensor 103 performs the first scanning operation to be described later are indicated as a hatched area 1201.

Figure 13:
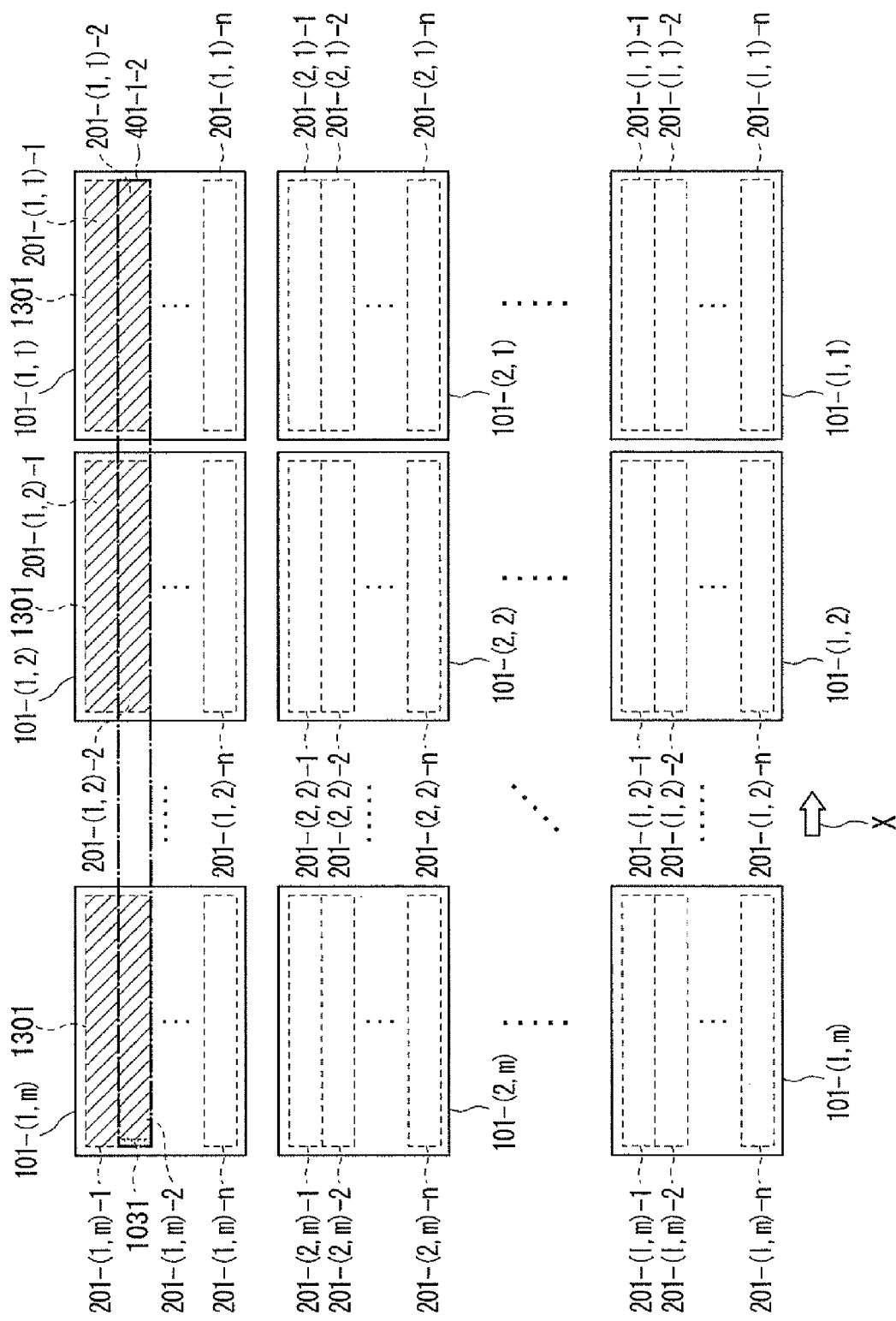
FIG. 13 is a diagram schematically illustrating areas of first and second partial images of the first slide group captured by the image-capturing system according to the third embodiment of the invention.

FIG. 13 is a diagram illustrating the areas of the first and second partial images 201-(1,1)-1 to 201-(1,m)-2 of the glass slides 101-(1,1) to 101-(1,m) of the first slide group 1101-1 acquired by the image-capturing system 100 after the line sensor 103 performs a second scanning operation to be described later in this embodiment. In FIG. 13, the glass slides 101-(1,1) to 101-(1,m), the visual field of observation 1031 of the line sensor 103, the first to n-th partial images 201-(1,1)-1 to 201-(1,m)-n of the glass slides 101-(1,1) to 101-(1,m), and a second partial image group 401-1-2 of the first slide group 1101-1 are shown. The second partial images 201-(1,1)-2 to 201-(1,m)-2 of the glass slides are defined as forming the second partial image group 401-1-2 of the first slide group 1101-1. In FIG. 13, the areas of the first and second partial images 201-(1,1)-1 to 201-(1,m)-2 of the first slide group 1101-1 acquired by the image-capturing system 100 after the line sensor 103 performs the second scanning operation to be described later are indicated as a hatched area 1301.

Figure 14:
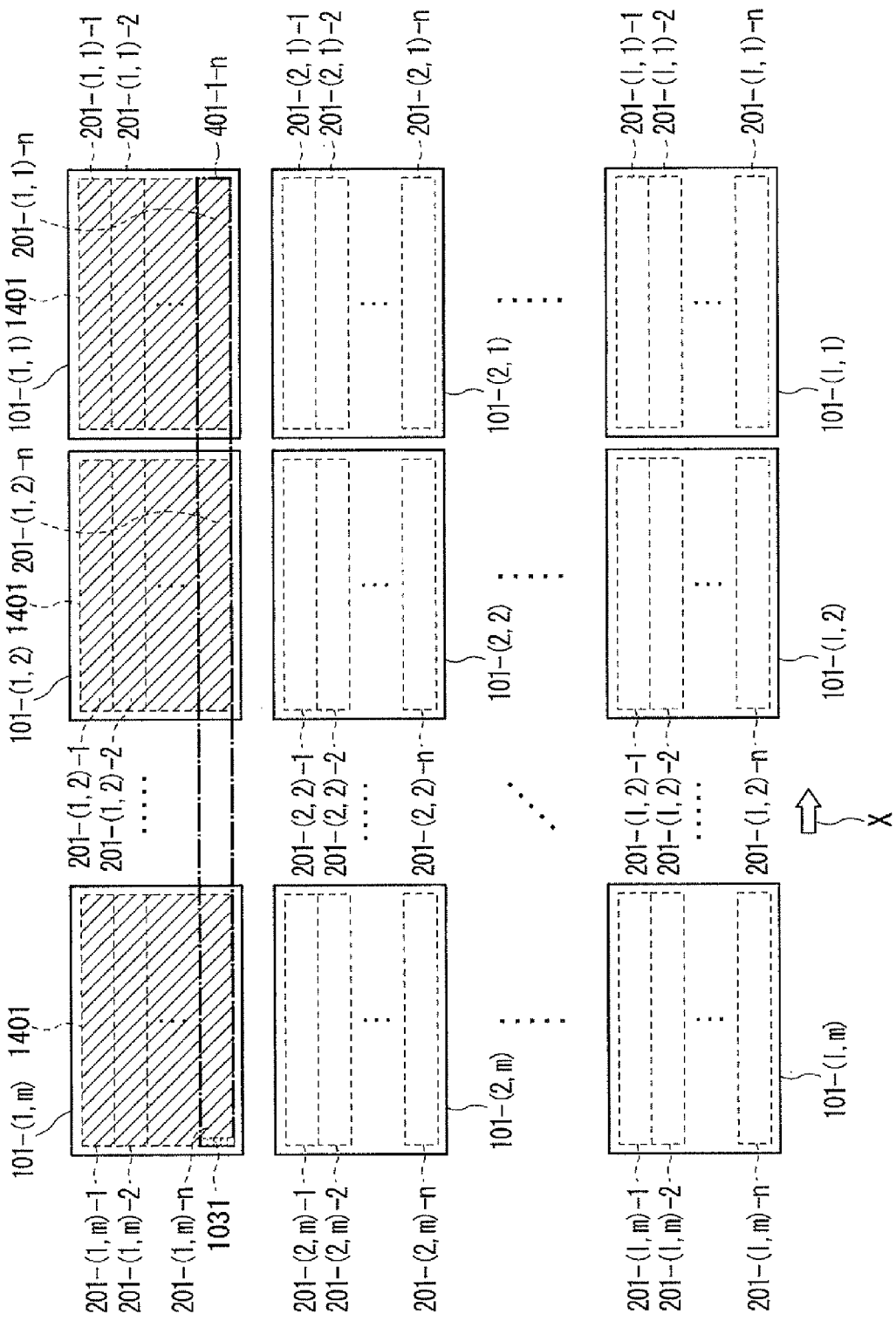
FIG. 14 is a diagram schematically illustrating areas of first to n-th partial images of the first slide group captured by the image-capturing system according to the third embodiment of the invention.

FIG. 14 is a diagram illustrating the areas of the first to n-th partial images 201-(1,1)-1 to 201-(1,m)-n of the glass slides of the first slide group 1101-1 acquired by the image-capturing system 100 after the line sensor 103 performs an n-th scanning operation to be described later in this embodiment. In FIG. 14, the glass slides 101-(1,1) to 101-(1,m), the visual field of observation 1031 of the line sensor 103, the first to n-th partial images 201-(1,1)-1 to 201-(1,m)-n of the glass slides 101-(1,1) to 101-(1,m), and an n-th partial image group 401-1-n of the first slide group 1101-1 are shown. The n-th partial images 201-(1,1)-n to 201-(1,m)-n of the glass slides are defined as forming the -th partial image group 401-1-n of the first slide group 1101-1. In FIG. 14, the areas of the first to n-th partial images 201-(1,1)-1 to 201-(1,m)-n of the first slide group 1101-1 acquired by the image-capturing system 100 after the line sensor 103 performs the n-th scanning operation to be described later are indicated as a hatched area 1401.

Figure 15:
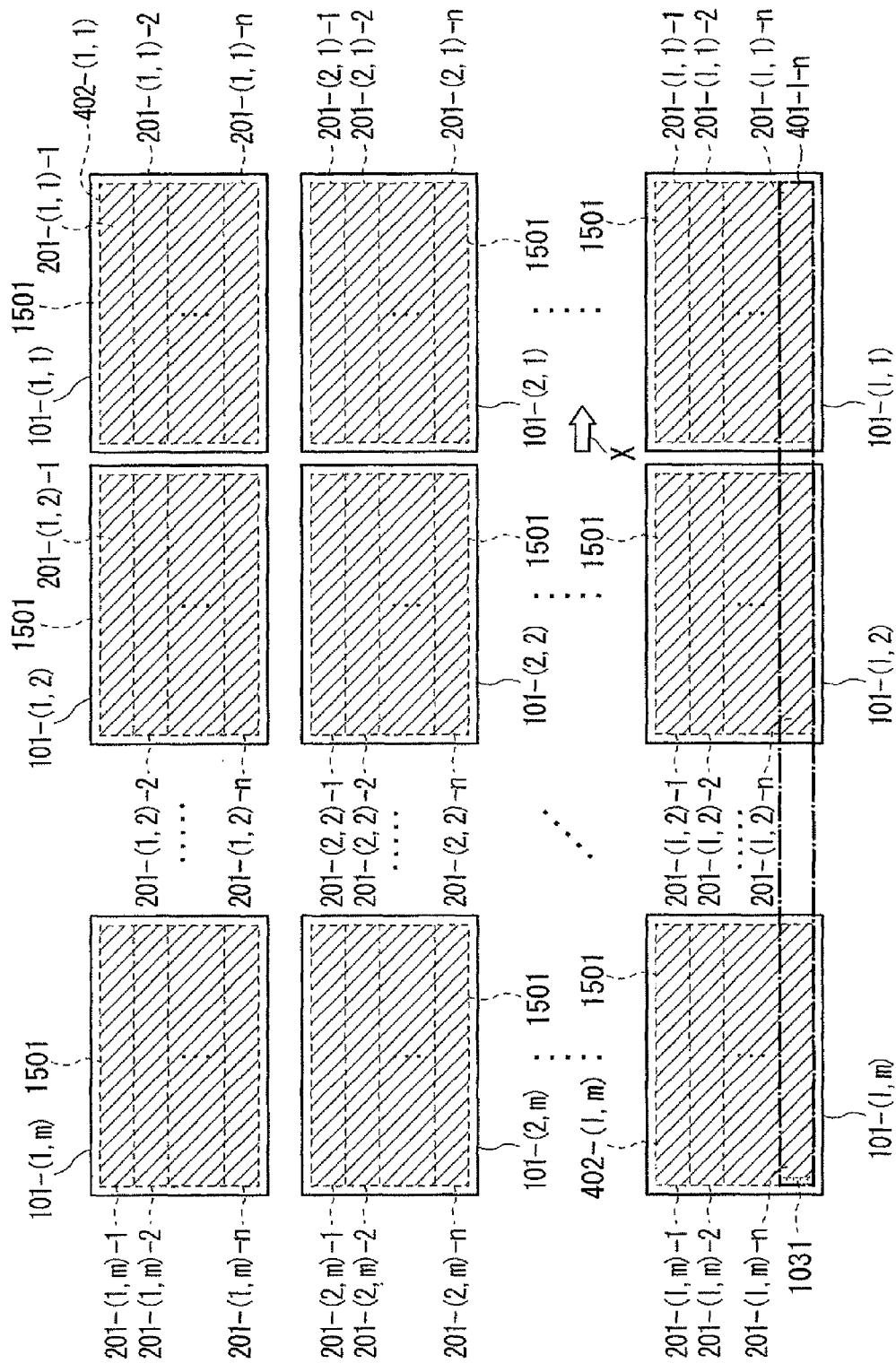
FIG. 15 is a diagram schematically illustrating areas of first to n-th partial images of the first to l-th slide groups captured by the image-capturing system according to the third embodiment of the invention.

FIG. 15 is a diagram illustrating the areas of the first to n-th partial images 201-(1,1)-1 to 201-(1,m)-n of the glass slides of the first to l-th slide groups 1101-1 to 1101-1 acquired by the image-capturing system 100 after the line sensor 103 performs an (n×l)-th scanning operation to be described later in this embodiment. In FIG. 15, the glass slides 101-(1,1) to 101-(1,m), the visual field of observation 1031 of the line sensor 103, the first to n-th partial images 201-(1,1)-1 to 201-(1,m)-n of the glass slides 101-(1,1) to 101-(1,m), and an n-th partial image group 401-1-n of the l-th slide group 1101-1 are shown. The n-th partial images 201-(1,1)-n to 201-(1,m)-n of the glass slides of the l-th slide group 1101-1 are defined as forming the n-th partial image group 401-1-n of the l-th slide group 1101-1. In FIG. 15, the areas of the first to n-th partial images 201-(1,1)-1 to 201-(1,m)-n of the first to l-th slide groups 1101-1 to 1101-1 acquired by the image-capturing system 100 after the line sensor 103 performs the (n×l)-th scanning operation to be described later are indicated as a hatched area 1501.

The operation of the image-capturing system 100 according to this embodiment will be described. First, the stage driving unit 105 drives the stage 102 having an endless-track shape in a constant direction (the direction of arrow X in FIGS. 6 and 11) until the driving speed of the stage reaches an image reading speed which is the speed at which the line sensor 103 scans the glass slides 101-(1,1) to 101-(1,m).

When the driving speed of the stage 102 reaches the image reading speed and the driving speed is stabilized, the imaging driving unit 106 moves the imaging unit 200 in the main scanning direction (Y-axis direction) of the line sensor 103 so that the visual field of observation 1031 of the line sensor 103 is located at the position for reading the area of the first partial image group 401-1-1 of the first slide group 1101-1 shown in FIG. 12.

Subsequently, the line sensor 103 scans (first scanning operation) the area of the first partial image group 401-1-1 of the first slide group 1101-1 including the first partial images 201-(1,1)-1 to 201-(1,m)-1 of the glass slides of the first slide group 1101-1 and converts the received light into an electrical signal. Then, the image processing unit 107 generates image data of the first partial image group 401-1-1 of the first slide group 1101-1 on the basis of the electrical signal output from the line sensor 103. Accordingly, after performing the first scanning operation, the image-capturing system 100 acquires the image data of the first partial image group 401-1-1 (the hatched area 1201 in FIG. 12) of the first slide group 1101-1.

When the image data of the first partial image group 401-1-1 of the first slide group 1101-1 is completely acquired, the imaging driving unit 106 moves the imaging unit 200 in the main scanning direction (the Y-axis direction) of the line sensor 103 so that the visual field of observation 1031 of the line sensor 103 is located at the position for reading the area of the second partial image group 401-1-2 of the first slide group 1101-1 shown in FIG. 13, and prepares to capture the image of the next imaging area of the glass slides 101, that is, the image of the second partial image group 401-1-2 of the first slide group 1101-1.

When the stage 102 having an endless-track shape circulates and the visual field of observation 1031 of the line sensor 103 reaches the area of the second partial image group 401-1-2 of the first slide group 1101-1 which is the next imaging area of the glass slide 101-(1,1), the line sensor 103 scans (performs a second scanning operation) the area of the second partial image group 401-1-2 of the first slide group 1101-1 including the second partial images 201-(1,1)-2 to 201-(1,m)-2 of the first slide group 1101-1 and converts the received light into an electrical signal. Subsequently, the image processing unit 107 generates the image data of the second partial image group 401-1-2 of the first slide group 1101-1 on the basis of the electrical signal output from the line sensor 103. Accordingly, after performing the second scanning operation, the image-capturing system 100 acquires the image data of the first and second partial image groups 401-1-1 and 401-1-2 of the first slide group 1101-1 (the hatched area 1301 in FIG. 13).

The image-capturing system 100 performs n scanning operations by repeating the above-mentioned operation. Accordingly, after performing the n-th scanning operation, the image-capturing system 100 acquires the image data of the first to n-th partial image groups 401-1-1 to 401-1-n of the first slide group 1101-1 (the hatched area 1401 in FIG. 14).

The image-capturing system 100 repeatedly performs the above-mentioned operation and acquires the image data of the partial image groups 401-2-1 to 401-1-n including the first to n-th partial images 201-(2,1)-1 to 201-(1,m)-n of the second to l-th slide groups 1101-2 to 1101-1 mounted on the stage 102. Accordingly, after performing the (n×l)-th scanning operation, the image-capturing system 100 acquires the image data of the first to n-th partial image groups 401-1-1 to 401-1-n of the first to l-th slide groups 1101-1 to 1101-1 (the hatched area 1501 in FIG. 15).

The image processing unit 107 divides the acquired image data of the partial image groups 401-1-1 to 401-1-n of the first to l-th slide groups 1101-1 to 1101-1 into the glass slides 101-(1,1) to 101-(1,m) and generates the image data of the first to n-th partial images 20141,1)-1 to 201-(1,m)-n.

The image processing unit 107 synthesizes the generated image data of the first to n-th partial images 201-(1,1)-1 to 201-(1,m)-n for each of the glass slides 101-(1,1) to 101-(1,m) and generates the image data of the entire images 402-(1,1) to 402-(1,m) of the glass slides 101-(1,1) to 101-(1,m).

For example, the image processing unit 107 synthesizes the image data of the first to n-th partial images 201-(1,1)-1 to 201-(1,1)-n of the glass slide 101-(1,1) and generates the image data of the entire image 402-(1,1) of the glass slide 101-(1,1). The image processing unit 107 generates the image data of the entire images 402-(1,2) to 402-(1,m) of the other glass slides 101-(1,2) to 101-(1,m) in the same way.

Accordingly, the image-capturing system 100 acquires the image data of the entire images 402-(1,1) to 402-(1,m) of the glass slides 101-(1,1) to 101-(1,m).

As described above, the image-capturing system 100 according to this embodiment includes the stage 102 having an endless-track shape and stably drives the stage 102 circulating in the endless-track shape in a constant direction without stopping. The image-capturing system 100 scans the glass slides 101-(1,1) to 101-(1,m) moved by the stage 102 and acquires the image data of the first to n-th partial images 201-(1,1)-1 to 201-(1,m)-n of the glass slides in the respective lines.

Therefore, when acquiring the image data of the first to n-th partial images 201-(1,1)-1 to 201-(1,m)-n of the glass slides in the respective lines, it is not necessary to repeat stopping of the moving stage or the acceleration of the stopped stage. Accordingly, a backlash of a stage carrying system such as the stage driving unit 105 does not occur. Therefore, the image-capturing system 100 acquires the image data of the first to n-th partial images 201-(1,1)-1 to 201-(1,m)-n with high precision without being affected by an error of the stage carrying system, synthesizes the acquired image data of the first to n-th partial images 201-(1,1)-1 to 201-(1,m)-n, and acquires the image data of the entire images 402-(1,1) to 402-(1,m).

In this embodiment, the plural glass slides 101-(1,1) to 101-(1,m) are arranged and mounted in a line in the circulating direction of the stage 102, that is, the sub scanning direction of the line sensor 103. That is, the glass slides 101-(1,1) to 101-(1,m) are arranged two-dimensionally and mounted on the stage 102.

Accordingly, the image-capturing system 100 can acquire the image data of the partial image groups 401-1-1 to 401-1-*n* of the first to l-th slide group 1101-1 to 1101-1 without moving the visual field of the line sensor 103 to a scanning position for each of the glass slides 101-(1,1) to 101-(1,m) at the time of scanning the glass slides 101-(1,1) to 101-(1,m). Accordingly, the image-capturing system 100 can acquire the entire image data of the glass slides 101-(1,1) to 101-(1,m) with high throughput.

Fourth Embodiment

A fourth embodiment of the invention will be described below. This embodiment is different from the second embodiment, in that a structure 701 having information on the time for moving a relative position of the line sensor 103 and the stage 102 is mounted on the stage 102 circulating in an endless-track shape.

Figure 16:
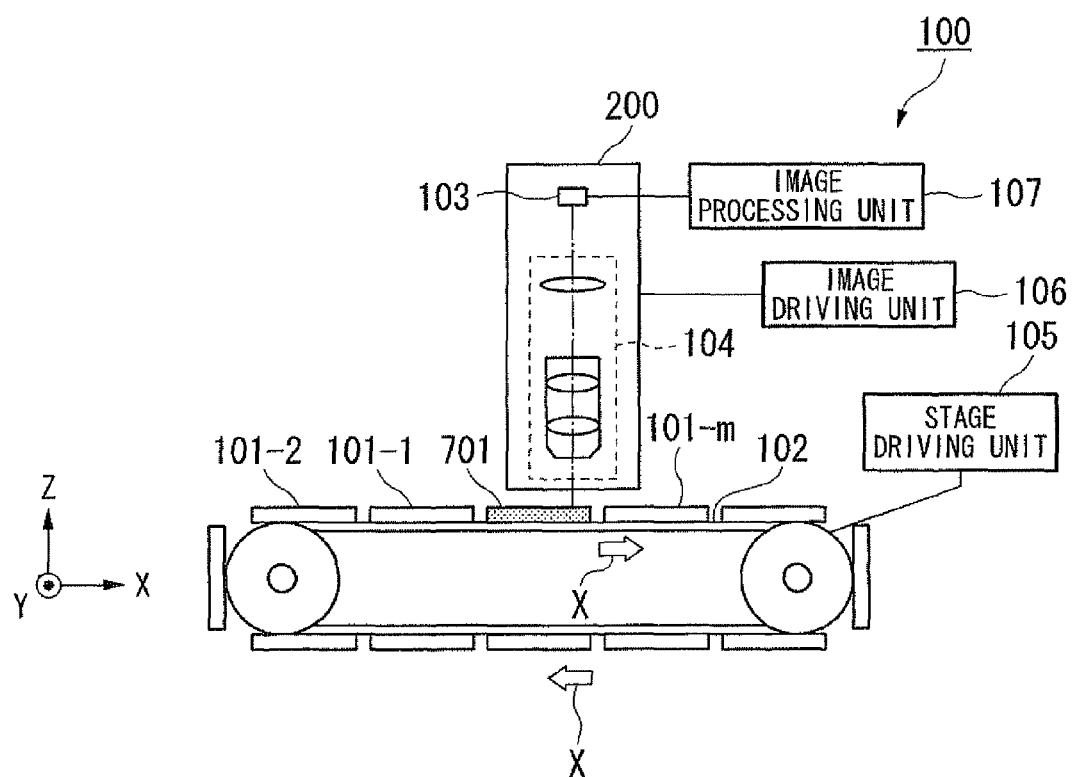
FIG. 16 is a diagram schematically illustrating the configuration of an image-capturing system according to a fourth embodiment of the invention.

FIG. 16 is a diagram schematically illustrating the configuration of an image-capturing system 100 according to this embodiment. FIG. 16 shows a side view of the image-capturing system 100. The configuration of the image-capturing system 100 according to this embodiment is the same as the configuration of the image-capturing system 100 according to the second embodiment. In FIG. 16, the same elements as shown in FIG. 6 are referenced by the same reference numerals as shown in FIG. 6.

In the example shown in FIG. 16, unlike the example shown in FIG. 6, the structure 701 having the information on the time for moving the relative position of the line sensor 103 and the stage 102 is mounted on the stage 102. The structure 701 having the information on the time for moving the relative position of the line sensor 103 and the stage 102 is disposed between the glass slides 101-1 and the glass slide 101-*m*.

Figure 17:
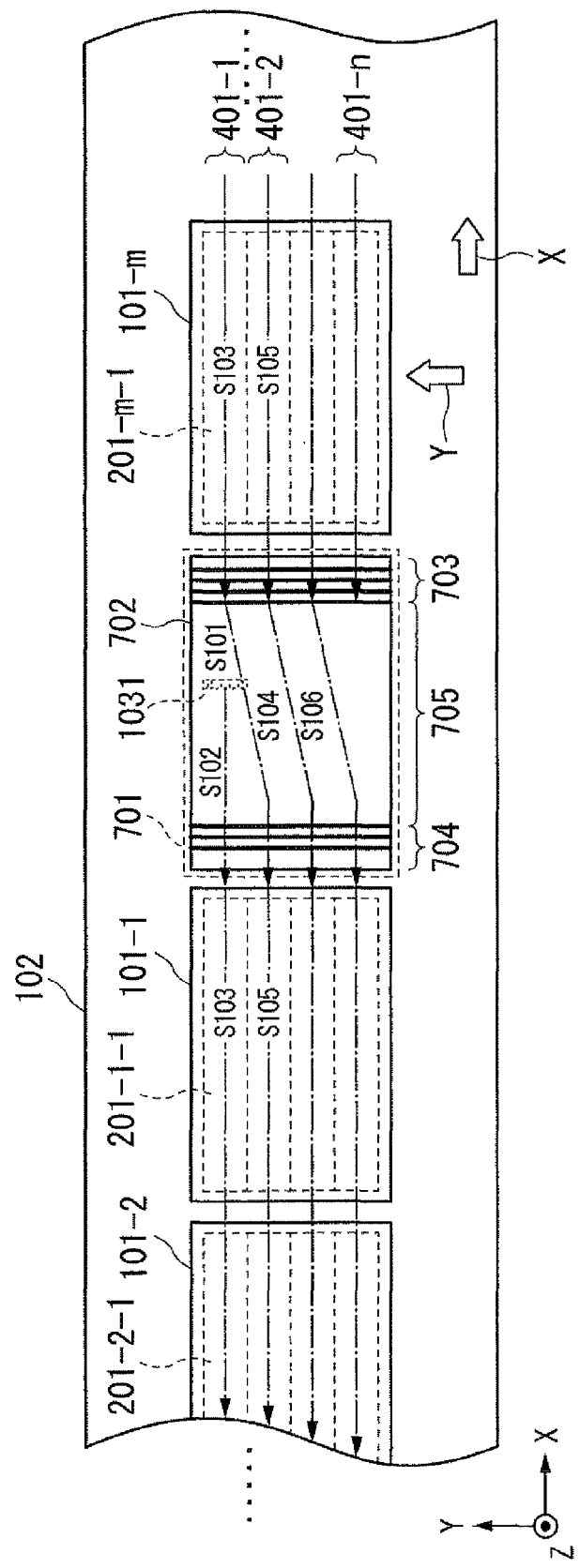
FIG. 17 is a diagram schematically illustrating a stage as viewed from the top side of the image-capturing system according to the fourth embodiment of the invention.

The arrangement of the glass slides 101-1 to 101-*m* and the structure 701 having the information on the time for moving the relative position of the line sensor 103 and the stage 102 will be described below. FIG. 17 is a diagram schematically illustrating the stage 102 on which the glass slides 101-1 to 101-*m* and the structure 701 having the information on the time for moving the relative position of the line sensor 103 and the stage 102 are mounted as viewed from the upside of the image-capturing system 100.

In the example shown in FIG. 17, the glass slides 101-1 to 101-*m* and the structure 701 having the information on the time for moving the relative position of the line sensor 103 and the stage 102 are mounted on the stage 102. The structure 701 having the information on the time for moving the relative position of the line sensor 103 and the stage 102 is disposed between the glass slide 101-1 and the glass slide 101-*m*. In FIG. 17, the visual field of observation 1031 of the line sensor 103 which is the area from which the image data is acquired by the line sensor 103 is shown.

In FIG. 17, the X-axis direction which is the sub scanning direction of the line sensor 103 is the direction from the left side to the right side of FIG. 17. The Y-axis direction which is the main scanning direction of the line sensor 103 is the direction from the lower side to the upper side of FIG. 17. The direction perpendicular to FIG. 17 is defined as the Z-axis direction. S101 to S106 shown in FIG. 17 represent the traces of the visual field of observation 1031 in steps S101 to S106 to be described later.

Here, the configuration of the structure 701 having the information on the time for moving the relative position of the line sensor 103 and the stage 102 will be described below. In the configuration of the structure 701 having the information on the time for moving the relative position of the line sensor 103 and the stage 102 shown in FIG. 17, a first marker 703 and a second marker 704 are disposed on a glass slide 702.

The first marker 703 is disposed in the front side (head part) of the glass slide 702 in the scanning direction of the line sensor 103. The second marker 704 is disposed in the tail part of the glass slide 702. In the example shown in FIG. 17, the first marker 703 is a figure including four straight lines. The second marker 704 is a figure including three straight lines.

Out of two positions, the position through which the line sensor 103 first passes by the circulation of the stage 102 is the front side with reference to the line sensor 103.

The area interposed between the first marker 703 and the second marker 704 is a line-sensor visual field moving area 705 used to move the imaging unit 200 in the main scanning direction of the line sensor 103 so that the visual field of observation 1031 of the line sensor 103 is located at a position for reading the area of a predetermined partial image group.

The operation of the image-capturing system 100 according to this embodiment will be described with reference to FIG. 17. In FIG. 17, the one-dot chained arrows represent the traces of the visual field of observation 1031 of the line sensor 103.

First, the stage driving unit 105 drives the stage 102 so that the visual field of observation 1031 of the line sensor 103 enters the vicinity of the first marker 703 or the line-sensor visual field moving area 705. At the same time, the imaging driving unit 106 moves the imaging unit 200 in the main scanning direction (in the Y-axis direction) of the line sensor 103 so that the visual field of observation 1031 of the line sensor 103 is located at the position for reading the area of the first partial image group 401-1 (step S101).

The stage driving unit 105 accelerates the stage 102 having an endless-track shape until the stage reaches the image reading speed which is the speed at which the line sensor 103 scans the glass slides 101-1 to 101-*m* during the visual field of observation 1031 of the line sensor 103 exists in the line-sensor visual field moving area 705, and keeps the speed constant (step S102).

When the image processing unit 107 detects the second marker 704 representing the end of the line-sensor visual field moving area 705 from the image data generated on the basis of the electrical signals from the line sensor 103, the detection of the second marker 704 is notified to the imaging driving unit 106. At this time, since the visual field of observation 1031 of the line sensor 103 departs from the line-sensor visual field moving area 705, the line sensor 103 scans (performs the first scanning operation) the area of the first partial image group 401-1 under the control of the imaging driving unit 106 and converts the received light into an electrical signal. The first partial image group 401-1 includes the first partial images 201-1-1 to 201-*m*-1 of the glass slides 101-1 to 101-*m*. Subsequently, the image processing unit 107 generates the image data of the first partial image group 401-1 on the basis of the electrical signal output from the line sensor 103. Accordingly, after performing the first scanning operation, the image-capturing system 100 acquires the image data of the first partial image group 401-1 (step S103).

When the stage 102 circulates and the image processing unit 107 detects the first marker 703 disposed in the front of the line-sensor visual field moving area 705 from the image data generated on the basis of the electrical signals from the line sensor 103, the detection of the first marker 703 is notified to the imaging driving unit 106. At this time, since the first partial image 201-*m*-1 of the last glass slide 101-*m* is completely scanned, the line sensor 103 finishes the scanning of the first partial image group 401-1 under the control of the imaging driving unit 106. Subsequently, the imaging driving unit 106 moves the imaging unit 200 in the main scanning direction of the line sensor 103 (in the Y-axis direction) so that the visual field of observation 1031 of the line sensor 103 is located at the position for reading the second partial image group 401-2 while the visual field of observation 1031 of the line sensor 103 exists in the line-sensor visual field moving area 705, and prepares to capture the image of the next imaging area of the glass slides 101-1 to 101-*m*, that is, the second partial image group 401-2 (step S104).

When the image processing unit 107 detects the second marker 704 representing the end of the line-sensor visual field moving area 705 from the image data generated on the basis of the electrical signals from the line sensor 103, the detection of the second marker 704 is notified to the imaging driving unit 106. At this time, since the visual field of observation 1031 of the line sensor 103 departs from the line-sensor visual field moving area 705, the line sensor 103 scans (performs the second scanning operation) the area of the second partial image group 401-2 under the control of the imaging driving unit 106 and converts the received light into an electrical signal. The second partial image group 401-2 includes the second partial images 201-1-2 to 201-*m*-2 of the glass slides 101-1 to 101-*m*. Subsequently, the image processing unit 107 generates the image data of the second partial image group 401-2 on the basis of the electrical signal output from the line sensor 103. Accordingly, after performing the second scanning operation, the image-capturing system 100 acquires the image data of the first and second partial image groups 401-1 and 401-2 (step S105).

When the stage 102 circulates and the image processing unit 107 detects the first marker 703 disposed in the front of the line-sensor visual field moving area 705 from the image data generated on the basis of the electrical signals from the line sensor 103, the detection of the first marker 703 is notified to the imaging driving unit 106. At this time, since the second partial image 201-*m*-2 of the last glass slide 101-*m* is completely scanned, the line sensor 103 finishes the scanning of the second partial image group 401-2 under the control of the imaging driving unit 106. Subsequently, the imaging driving unit 106 moves the imaging unit 200 in the main scanning direction of the line sensor 103 (in the Y-axis direction) so that the visual field of observation 1031 of the line sensor 103 is located at the position for reading the third partial image group 401-3 while the visual field of observation 1031 of the line sensor 103 exists in the line-sensor visual field moving area 705, and prepares to capture the image of the next imaging area of the glass slides 101-1 to 101-*m*, that is, the third partial image group 401-3 (step S106).

The image-capturing system 100 performs n scanning operations by repeating the above-mentioned operation. Accordingly, after performing the n-th scanning operation, the image-capturing system 100 acquires the image data of the first to n-th partial image groups 401-1 to 401-*n* (step S107).

The image processing unit 107 divides the acquired image data of the first to n-th partial image groups 401-1 to 401-*n* into the glass slides 101-1 to 101-*m* and generates the image data of the first to n-th partial images 201-1-1 to 201-*m*-*n* (step S108).

The image processing unit 107 synthesizes the generated image data of the first to n-th partial images 201-1-1 to 201-*m*-*n* for each of the glass slides 101-1 to 101-*m* and generates the image data of the entire images 402-1 to 402-*m* of the glass slides 101-1 to 101-*m* (step S109).

For example, the image processing unit 107 synthesizes the image data of the first to n-th partial images 201-1-1 to 201-1-*n* and generates the image data of the entire image 402-1 of the glass slide 101-1. The image processing unit 107 generates the image data of the entire images 402-2 to 402-*m* of the other glass slides 101-2 to 101-*m* in the same way.

Accordingly, the image-capturing system 100 acquires the image data of the entire images 402-1 to 402-*m* of the glass slides 101-1 to 101-*m*.

As described above, since the image-capturing system 100 according to this embodiment includes the structure 701 having the information on the time for moving the relative position of the line sensor 103 and the stage 102, it is possible to accurately and precisely move the visual field of observation 1031 of the line sensor 103, thereby acquiring the image data with high throughput and high precision. Since the line sensor 103 acquires the information on the time for moving the relative position of the line sensor 103 and the stage 102, it is not necessary to provide a dedicated sensor and it is possible to easily implement the image-capturing system 100 according to this embodiment.

At the time of starting the driving of the stage 102 in step S102, when the stage 102 cannot be accelerated up to the image reading speed while the visual field of observation 1031 of the line sensor 103 exists in the line-sensor visual field moving area 705, the stage driving unit 105 may drive the stage 102 in step S101 so that the visual field of observation 1031 of the line sensor 103 is located in the front of the first marker 703.

Figure 18:
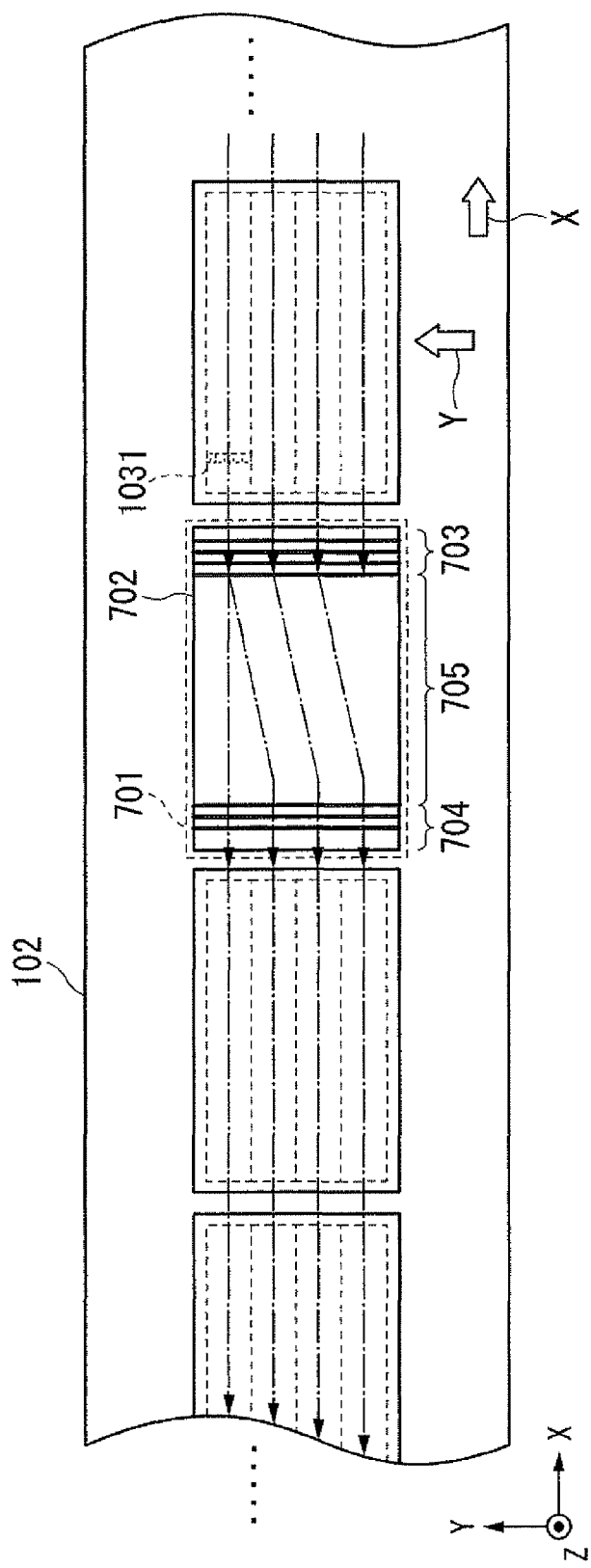
FIG. 18 is a diagram schematically illustrating a visual field of observation when the stage is driven so as to locate the visual field of observation of a line sensor in the front of a first marker in the fourth embodiment of the invention.

FIG. 18 is a diagram schematically illustrating the visual field of observation 1031 when the stage 102 is driven so that the visual field of observation 1031 of the line sensor 103 is located in the front of the first marker 703. FIG. 18 is different from FIG. 17, in the position of the visual field of observation 1031 of the line sensor 103. In the example shown in FIG. 18, the visual field of observation 1031 of the line sensor 103 is located in the front of the first marker 703. Accordingly, the stage driving unit 105 can use a longer distance to accelerate the stage 102, and can accelerate the stage 102 up to the image reading speed while the visual field of observation 1031 of the line sensor 103 exists in the line-sensor visual field moving area 705.

In this embodiment, the first marker 703 and the second marker 704 constituting the structure 701 having the information on the time for moving the relative position of the line sensor 103 and the stage 102 are disposed on the glass slide 702, but the invention is not limited to this configuration. For example, the first marker 703 and the second marker 704 constituting the structure 701 having the information on the time for moving the relative position of the line sensor 103 and the stage 102 may be disposed directly on the stage 102.

Fifth Embodiment

A fifth embodiment of the invention will be described below. This embodiment is different from the fourth embodiment, in that a sensor reading the information on the time for moving the relative position of the line sensor 103 and the stage 102 is provided independent of the line sensor 103.

Figure 19:
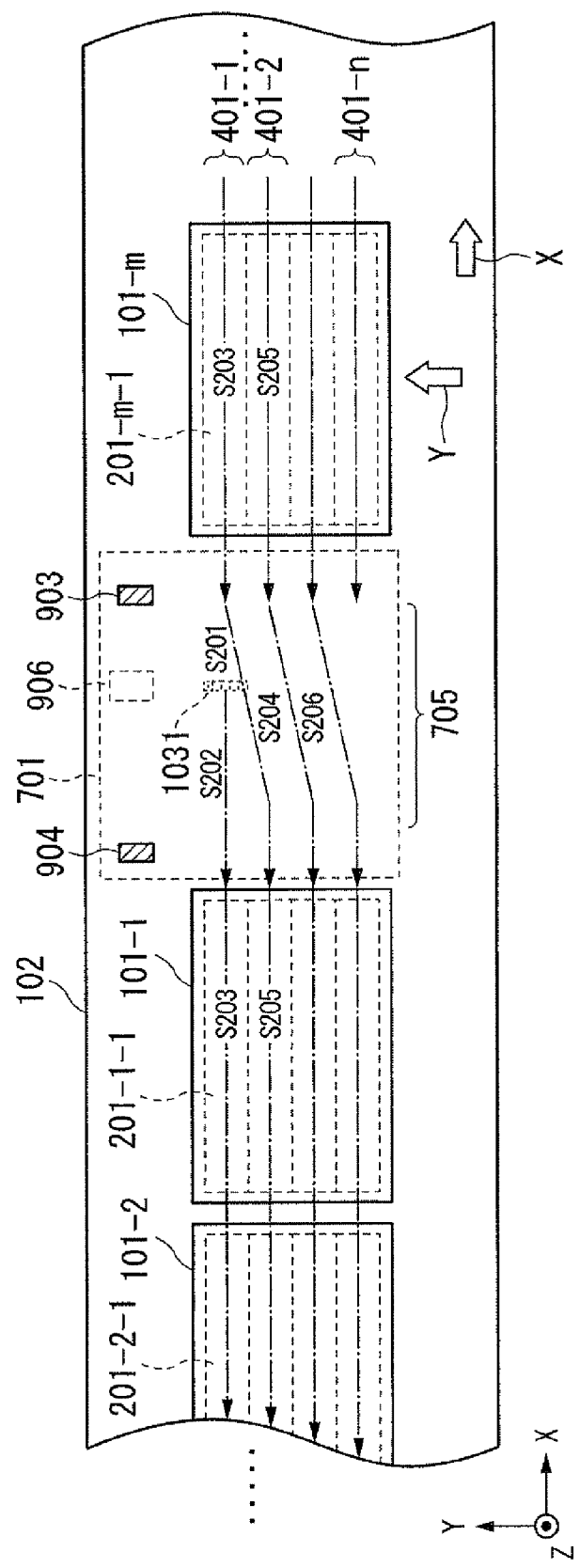
FIG. 19 is a diagram schematically illustrating a stage as viewed from the top side of the image-capturing system according to the fifth embodiment of the invention.

FIG. 19 is a diagram schematically illustrating the glass slides 101-1 to 101-*m* mounted on the stage 102 and the structure 701 having the information on the time for moving the relative position of the line sensor 103 and the stage 102 as viewed from the upside of the image-capturing system 100.

In the example shown in FIG. 19, the glass slides 101-1 to 101-*m* and the structure 701 having the information on the time for moving the relative position of the line sensor 103 and the stage 102 are mounted on the stage 102. The image-capturing system 100 according to this embodiment includes a photo interrupter 906 (sensor) as a detection mechanism other than the line sensor 103. The photo interrupter 906 is disposed in an extension in the scanning direction of the visual field of observation 1031 of the line sensor 103 and detects a first slit 903 and a second slit 904 to be described later.

The structure 701 having the information on the time for moving the relative position of the line sensor 103 and the stage 102 is disposed between the glass slide 101-1 and the glass slide 101-*m*. In FIG. 19, the visual field of observation 1031 of the line sensor 103 which is the area from which the image data is acquired by the line sensor 103 is shown.

In FIG. 19, the X-axis direction which is the sub scanning direction of the line sensor 103 is the direction from the left side to the right side of FIG. 19. The Y-axis direction which is the main scanning direction of the line sensor 103 is the direction from the lower side to the upper side of FIG. 19. The direction perpendicular to FIG. 19 is defined as the Z-axis direction. S201 to S206 shown in FIG. 19 represent the traces of the visual field of observation 1031 in steps S201 to S206 to be described later.

Here, the configuration of the structure 701 having the information on the time for moving the relative position of the line sensor 103 and the stage 102 will be described below. The structure 701 having the information on the time for moving the relative position of the line sensor 103 and the stage 102 shown in FIG. 19 includes a first slit 903 and a second slit 904.

The area interposed between the first slit 903 and the second slit 904 is a line-sensor visual field moving area 705 in which the visual field of observation 1031 of the line sensor 103 is moved in the main scanning direction of the line sensor 103 so as to acquire a predetermined partial image group of the glass slides.

The first slit 903 is formed in the front of the line-sensor visual field moving area 705, that is, in the vicinity of the last glass slide 101-*m*, in the scanning direction of the line sensor 103. The second slit 904 is formed in the back of the line-sensor visual field moving area 705, that is, in the vicinity of the first glass slide 101-1. The first slit 903 and the second slit 904 are disposed at positions not overlapping with the glass slides 101 so that the photo interrupter 906 detects a signal.

The operation of the image-capturing system 100 according to this embodiment will be described with reference to FIG. 19. In FIG. 19, the one-dot chained arrows represent the traces of the visual field of observation 1031 of the line sensor 103.

First, the stage driving unit 105 drives the stage 102 so that the visual field of observation 1031 of the line sensor 103 enters the vicinity of the first slit 903 or the line-sensor visual field moving area 705. At the same time, the imaging driving unit 106 moves the imaging unit 200 in the main scanning direction (in the Y-axis direction) of the line sensor 103 so that the visual field of observation 1031 of the line sensor 103 is located at the position for reading the area of the first partial image group 401-1 (step S201).

The stage driving unit 105 accelerates the stage 102 having an endless-track shape until the stage reaches the image reading speed which is the speed at which the line sensor 103 scans the glass slides 101-1 to 101-*m* during the visual field of observation 1031 of the line sensor 103 exists in the line-sensor visual field moving area 705, and keeps the speed constant (step S202).

When the photo interrupter 906 detects the second slit 904 representing the end of the line-sensor visual field moving area 705, the detection of the second slit 904 is notified to the imaging driving unit 106. At this time, since the visual field of observation 1031 of the line sensor 103 departs from the line-sensor visual field moving area 705, the line sensor 103 scans (performs the first scanning operation) the area of the first partial image group 401-1 under the control of the imaging driving unit 106 and converts the received light into an electrical signal. The first partial image group 401-1 includes the first partial images 201-1-1 to 201-*m*-1 of the glass slides 101-1 to 101-*m*. Subsequently, the image processing unit 107 generates the image data of the first partial image group 401-1 on the basis of the electrical signal output from the line sensor 103. Accordingly, after performing the first scanning operation, the image-capturing system 100 acquires the image data of the first partial image group 401-1 (step S203).

When the stage 102 circulates and the photo interrupter 906 detects the first slit 903 disposed in the front of the line-sensor visual field moving area 705, the detection of the first slit 903 is notified to the imaging driving unit 106. At this time, since the first partial image 201-*m*-1 of the last glass slide 101-*m* is completely scanned, the line sensor 103 finishes the scanning of the first partial image group 401-1 under the control of the imaging driving unit 106. Subsequently, the imaging driving unit 106 moves the imaging unit 200 in the main scanning direction of the line sensor 103 (in the Y-axis direction) so that the visual field of observation 1031 of the line sensor 103 is located at the position for reading the second partial image group 401-2 while the visual field of observation 1031 of the line sensor 103 exists in the line-sensor visual field moving area 705, and prepares to capture the image of the next imaging area of the glass slides 101-1 to 101-*m*, that is, the second partial image group 401-2 (step S204).

When the photo interrupter 906 detects the second slit 904 representing the end of the line-sensor visual field moving area 705, the detection of the second slit 904 is notified to the imaging driving unit 106. At this time, since the visual field of observation 1031 of the line sensor 103 departs from the line-sensor visual field moving area 705, the line sensor 103 scans (performs the second scanning operation) the area of the second partial image group 401-2 under the control of the imaging driving unit 106 and converts the received light into an electrical signal. The second partial image group 401-2 includes the second partial images 201-1-2 to 201-*m*-2 of the respective glass slides 101-1 to 101-*m*. Subsequently, the image processing unit 107 generates the image data of the second partial image group 401-2 on the basis of the electrical signal output from the line sensor 103. Accordingly, after performing the second scanning operation, the image-capturing system 100 acquires the image data of the first and second partial image groups 401-1 and 401-2 (step S205).

When the stage 102 circulates and the photo interrupter 906 detects the first slit 903 disposed in the front of the line-sensor visual field moving area 705, the detection of the first slit 903 is notified to the imaging driving unit 106. At this time, since the second partial image 201-m-2 of the last glass slide 101-m is completely scanned, the line sensor 103 finishes the scanning of the second partial image group 401-2 under the control of the imaging driving unit 106. Subsequently, the imaging driving unit 106 moves the imaging unit 200 in the main scanning direction of the line sensor 103 (in the Y-axis direction) so that the visual field of observation 1031 of the line sensor 103 is located at the position for reading the third partial image group 401-3 while the visual field of observation 1031 of the line sensor 103 exists in the line-sensor visual field moving area 705, and prepares to capture the image of the next imaging area of the glass slides 101-1 to 101-m, that is, the third partial image group 401-3 (step S206).

The image-capturing system 100 performs n scanning operations by repeating the above-mentioned operation. Accordingly, after performing the n-th scanning operation, the image-capturing system 100 acquires the image data of the first to n-th partial image groups 401-1 to 401-n (step S207).

The image processing unit 107 divides the acquired image data of the first to n-th partial image groups 401-1 to 401-n into the glass slides 101-1 to 101-m and generates the image data of the first to n-th partial images 201-1-1 to 201-m-n (step S208).

The image processing unit 107 synthesizes the generated image data of the first to n-th partial images 201-1-1 to 201-m-n for each of the glass slides 101-1 to 101-m and generates the image data of the entire images 402-1 to 402-m of the glass slides 101-1 to 101-m (step S209).

For example, the image processing unit 107 synthesizes the image data of the first to n-th partial images 201-1-1 to 201-1-n and generates the image data of the entire image 402-1 of the glass slide 101-1. The image processing unit 107 generates the image data of the entire images 402-2 to 402-m of the other glass slides 101-2 to 101-m in the same way.

Accordingly, the image-capturing system 100 acquires the image data of the entire images 402-1 to 402-m of the glass slides 101-1 to 101-m.

As described above, the photo interrupter 906 which is a detection mechanism other than the line sensor 103 is provided in this embodiment. The photo interrupter 906 reads the information on the time for moving the relative position of the line sensor 103 and the stage 102 from the first slit 903 and the second slit 904. Accordingly, since the information on the time for moving the relative position of the line sensor 103 and the stage 102 is read by a dedicated detection mechanism, it is possible to reduce the burden on the image processing unit 107, thereby acquiring an image with high throughput and high precision.

Sixth Embodiment

A sixth embodiment of the invention will be described below. This embodiment is different from the fourth embodiment, in that a structure 1001 having information on an area of the stage 102 which is not scanned by the line sensor 103 is mounted on the stage 102 circulating in an endless-track shape.

Figure 20:
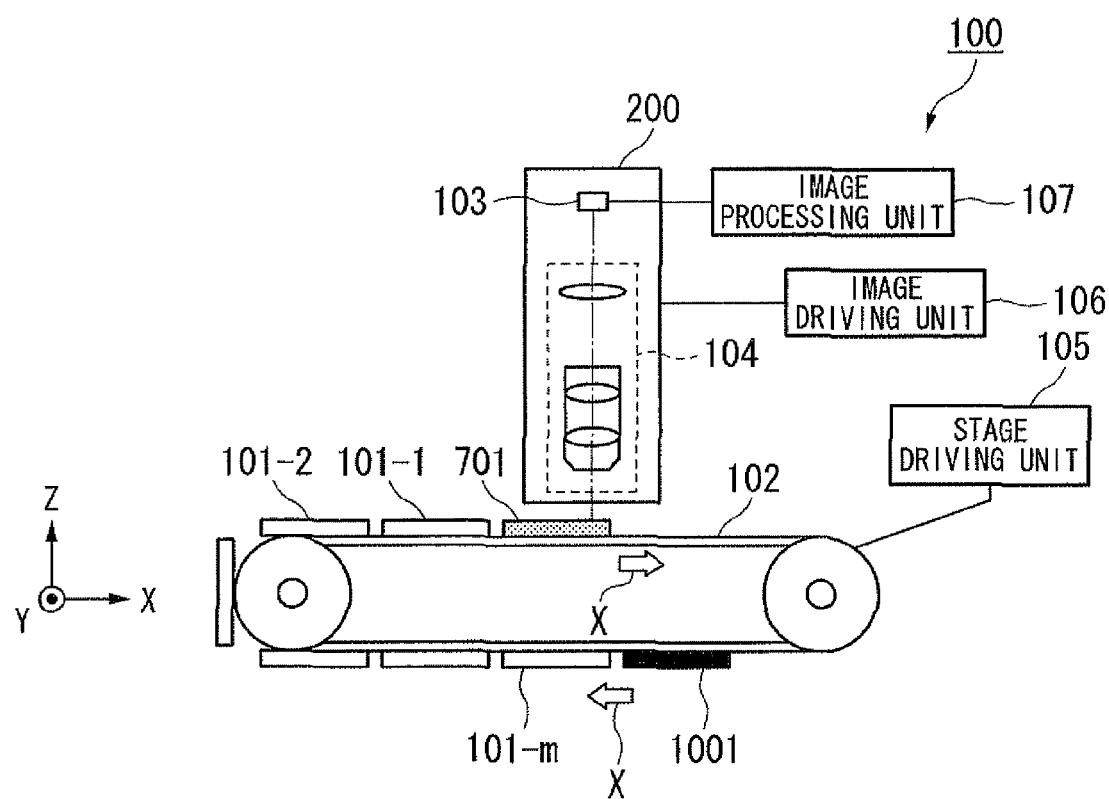
FIG. 20 is a diagram schematically illustrating the configuration of an image-capturing system according to a sixth embodiment of the invention.

FIG. 20 is a diagram schematically illustrating the configuration of an image-capturing system 100 according to this embodiment. FIG. 20 shows a side view of the image-capturing system 100. The configuration of the image-capturing system 100 according to this embodiment is the same as the configuration of the image-capturing system 100 according to the fourth embodiment. In FIG. 20, the same elements as shown in FIG. 16 are referenced by the same reference numerals as shown in FIG. 16.

In the example shown in FIG. 20, unlike the example shown in FIG. 16, the glass slides 101-1 to 101-m are mounted on only a part of the stage 102. The structure 701 having the information on the time for moving the relative position of the line sensor 103 and the stage 102 is disposed in the front of the first glass slide 101-1. The structure 1001 having the information on the area of the stage 102 which is not scanned by the line sensor 103 is mounted in the back of the last glass slide 101-m. Nothing is disposed between the structure 1001 having the information on the area of the stage 102 which is not scanned by the line sensor 103 and the structure 701 having the information on the time for moving the relative position of the line sensor 103 and the stage 102.

The arrangement of the glass slides 101-1 to 101-m, the structure 701 having the information on the time for moving the relative position of the line sensor 103 and the stage 102, and the structure 1001 having the information on the area of the stage 102 which is not scanned by the line sensor 103 will be described below.

Figure 21:
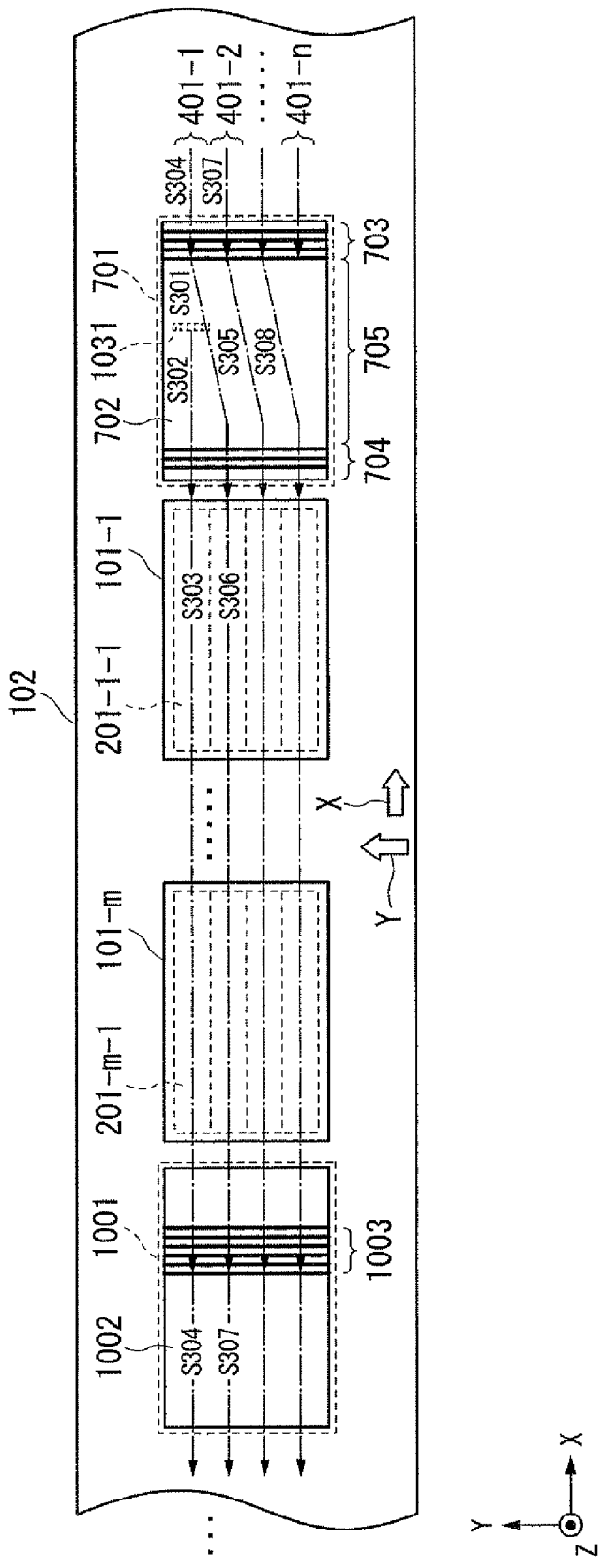
FIG. 21 is a diagram schematically illustrating a stage as viewed from the top side of the image-capturing system according to the sixth embodiment of the invention.

FIG. 21 is a diagram schematically illustrating the stage 102 on which the glass slides 101-1 to 101-m, the structure 701 having the information on the time for moving the relative position of the line sensor 103 and the stage 102, and the structure 1001 having the information on the area of the stage 102 which is not scanned by the line sensor 103 are mounted as viewed from the upside of the image-capturing system 100.

In the example shown in FIG. 21, the glass slides 101-1 to 101-m, the structure 701 having the information on the time for moving the relative position of the line sensor 103 and the stage 102, and the structure 1001 having the information on the area of the stage 102 which is not scanned by the line sensor 103 are mounted on the stage 102. The structure 701 having the information on the time for moving the relative position of the line sensor 103 and the stage 102 is disposed in the front of the first glass slide 101-1. The structure 1001 having the information on the area of the stage 102 which is not scanned by the line sensor 103 is disposed in the back of the last glass slide 101-m. In FIG. 21, a visual field of observation 1031 of the line sensor 103 which is an area from which the image data is acquired by the line sensor 103 is shown.

In FIG. 21, the X-axis direction which is the sub scanning direction of the line sensor 103 is the direction from the left side to the right side of FIG. 21. The Y-axis direction which is the main scanning direction of the line sensor 103 is the direction from the lower side to the upper side of FIG. 21. The direction perpendicular to FIG. 21 is defined as the Z-axis direction. S301 to S308 shown in FIG. 21 represent the traces of the visual field of observation 1031 in steps S301 to S308 to be described later.

The configuration of the structure 701 having the information on the time for moving the relative position of the line sensor 103 and the stage 102 is the same as the configuration of the structure 701 having the information on the time for moving the relative position of the line sensor 103 and the stage 102 according to the fourth embodiment.

Here, the configuration of the structure 1001 having the information on the area of the stage 102 which is not scanned by the line sensor 103 will be described. In the configuration of the structure 1001 having the information on the area of the stage 102 which is not scanned by the line sensor 103 shown in FIG. 21, a third marker 1003 is disposed on a glass slide 1002. In the example shown in FIG. 21, the third marker 1003 is a figure including six straight lines. The third marker 1003 may be disposed at any position of the glass slide 1002 as long as it can be read by the line sensor 103.

The operation of the image-capturing system 100 according to this embodiment will be described with reference to FIG. 21. In FIG. 21, the one-dot chained arrows represent the traces of the visual field of observation 1031 of the line sensor 103.

First, the stage driving unit 105 drives the stage 102 so that the visual field of observation 1031 of the line sensor 103 enters the vicinity of the first marker 703 or the line-sensor visual field moving area 705. At the same time, the imaging driving unit 106 moves the imaging unit 200 in the main scanning direction (in the Y-axis direction) of the line sensor 103 so that the visual field of observation 1031 of the line sensor 103 is located at the position for reading the area of the first partial image group 401-1 (step S301).

The stage driving unit 105 accelerates the stage 102 having an endless-track shape until the stage reaches the image reading speed which is the speed at which the line sensor 103 scans the glass slides 101-1 to 101-$m$ during the visual field of observation 1031 of the line sensor 103 exists in the line-sensor visual field moving area 705, and keeps the speed constant (step S302).

When the image processing unit 107 detects the second marker 704 representing the end of the line-sensor visual field moving area 705 from the image data generated on the basis of the electrical signals from the line sensor 103, the detection of the second marker 704 is notified to the imaging driving unit 106. At this time, since the visual field of observation 1031 of the line sensor 103 departs from the line-sensor visual field moving area 705, the line sensor 103 scans (performs the first scanning operation) the area of the first partial image group 401-1 under the control of the imaging driving unit 106 and converts the received light into an electrical signal. The first partial image group 401-1 includes the first partial images 201-1-1 to 201-$m$-1 of the respective glass slides 101-1 to 101-$m$. Subsequently, the image processing unit 107 generates the image data of the first partial image group 401-1 on the basis of the electrical signal output from the line sensor 103. Accordingly, after performing the first scanning operation, the image-capturing system 100 acquires the image data of the first partial image group 401-1 (step S303).

When the image processing unit 107 detects the third marker 1003 disposed in the structure 1001 having the information on the area of the stage 102 which is not scanned by the line sensor 103 and being disposed in the back of the last glass slide 101-$m$ from the image data generated on the basis of the electrical signals from the line sensor 103, the detection of the third marker 1003 is notified to the stage driving unit 105 and the imaging driving unit 106. At this time, since no glass slide 101 exists thereafter, the line sensor 103 finishes the scanning of the first partial image group 401-1 under the control of the imaging driving unit 106. Subsequently, the stage driving unit 105 enhances the speed of the stage 102 to be higher than the image reading speed (step S304).

When the stage 102 circulates and the image processing unit 107 detects the first marker 703 disposed in the front of the line-sensor visual field moving area 705 from the image data generated on the basis of the electrical signals from the line sensor 103, the detection of the first marker 703 is notified to the stage driving unit 105 and the imaging driving unit 106. At this time, the stage driving unit 105 decelerates the stage 102 having an endless-track shape until the speed of the stage 102 reaches the image reading speed at which the line sensor 103 scans the glass slides 101-1 to 101-$m$ while the visual field of observation 1031 of the line sensor 103 exists in the line-sensor visual field moving area 705, and keeps the speed constant. At the same time, the imaging driving unit 106 moves the imaging unit 200 in the main scanning direction of the line sensor 103 (in the Y-axis direction) so that the visual field of observation 1031 of the line sensor 103 is located at the position for reading the second partial image group 401-2 while the visual field of observation 1031 of the line sensor 103 exists in the line-sensor visual field moving area 705, and prepares to capture the image of the next imaging area of the glass slides 101-1 to 101-$m$, that is, the second partial image group 401-2 (step S305).

When the image processing unit 107 detects the second marker 704 representing the end of the line-sensor visual field moving area 705 from the image data generated on the basis of the electrical signals from the line sensor 103, the detection of the second marker 704 is notified to the imaging driving unit 106. At this time, since the visual field of observation 1031 of the line sensor 103 departs from the line-sensor visual field moving area 705, the line sensor 103 scans (performs the second scanning operation) the area of the second partial image group 401-2 under the control of the imaging driving unit 106 and converts the received light into an electrical signal. The second partial image group 401-2 includes the second partial images 201-1-2 to 201-$m$-2 of the respective glass slides 101-1 to 101-$m$. Subsequently, the image processing unit 107 generates the image data of the second partial image group 401-2 on the basis of the electrical signal output from the line sensor 103. Accordingly, after performing the second scanning operation, the image-capturing system 100 acquires the image data of the first and second partial image groups 401-1 and 401-2 (step S306).

When the image processing unit 107 detects the third marker 1003 disposed in the structure 1001 having the information on the area of the stage 102 which is not scanned by the line sensor 103 and being disposed in the back of the last glass slide 101-$m$ from the image data generated on the basis of the electrical signals from the line sensor 103, the detection of the third marker 1003 is notified to the stage driving unit 105 and the imaging driving unit 106. At this time, since no glass slide 101 exists thereafter, the line sensor 103 finishes the scanning of the second partial image group 401-2 under the control of the imaging driving unit 106. Subsequently, the stage driving unit 105 enhances the speed of the stage 102 to be higher than the image reading speed (step S307).

When the stage 102 circulates and the image processing unit 107 detects the first marker 703 disposed in the front of the line-sensor visual field moving area 705 from the image data generated on the basis of the electrical signals from the line sensor 103, the detection of the first marker 703 is notified to the stage driving unit 105 and the imaging driving unit 106. At this time, the stage driving unit 105 decelerates the stage 102 having an endless-track shape until the speed of the stage 102 reaches the image reading speed at which the line sensor 103 scans the glass slides 101-1 to 101-$m$ while the visual field of observation 1031 of the line sensor 103 exists in the line-sensor visual field moving area 705, and keeps the speed constant. At the same time, the imaging driving unit 106 moves the imaging unit 200 in the main scanning direction of the line sensor 103 (in the Y-axis direction) so that the visual field of observation 1031 of the line sensor 103 is located at the position for reading the third partial image group 401-3 while the visual field of observation 1031 of the line sensor 103 exists in the line-sensor visual field moving area 705, and prepares to capture the image of the next imaging area of the glass slides 101-1 to 101-$m$, that is, the third partial image group 401-3 (step S308).

The image-capturing system 100 performs n scanning operations by repeating the above-mentioned operation.

Accordingly, after performing the n-th scanning operation, the image-capturing system 100 acquires the image data of the first to n-th partial image groups 401-1 to 401-n (step S309).

The image processing unit 107 divides the acquired image data of the first to n-th partial image groups 401-1 to 401-n into the glass slides 101-1 to 101-m and generates the image data of the first to n-th partial images 201-1-1 to 201-m-n (step S310).

The image processing unit 107 synthesizes the generated image data of the first to n-th partial images 201-1-1 to 201-m-n for each of the glass slides 101-1 to 101-m and generates the image data of the entire images 402-1 to 402-m of the glass slides 101-1 to 101-m (step S311).

For example, the image processing unit 107 synthesizes the image data of the first to n-th partial images 201-1-1 to 201-m-n and generates the image data of the entire image 402-1 of the glass slide 101-1. The image processing unit 107 generates the image data of the entire images 402-2 to 402-m of the other glass slides 101-2 to 101-m in the same way.

Accordingly, the image-capturing system 100 acquires the image data of the entire images 402-1 to 402-m of the glass slides 101-1 to 101-m.

As described above, since the structure 701 having the information on the time for moving the relative position of the line sensor 103 and the stage 102 and the structure 1001 having the information on the area of the stage 102 which is not scanned by the line sensor 103 are provided in this embodiment, the line sensor 103 can detect the area in which no glass slide 101 is disposed. Since the stage driving unit 105 drives the stage 102 at a high speed in the area in which no glass slide 101 is disposed, it is possible to capture the image of the glass slides with higher throughput.

Although the first embodiment to the sixth embodiment of the invention have been described with reference to the drawings, the specific configuration of the invention is not limited to the embodiments, but may include a design not departing from the spirit of the invention.

Modified Examples

Figure 22:
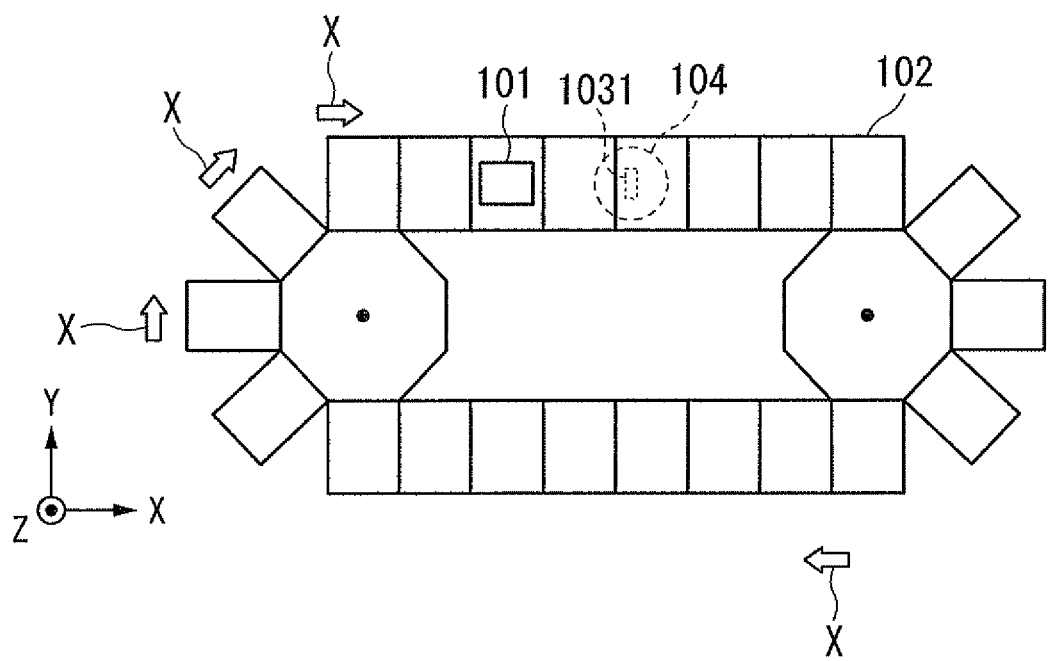
FIG. 22 is a diagram schematically illustrating a stage circulating in a plane as viewed from the upside of an image-capturing system.
Figure 23:
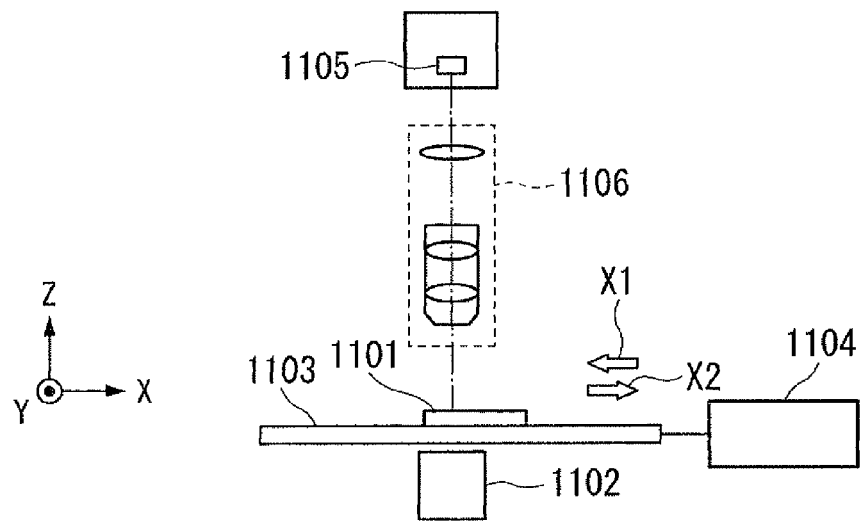
FIG. 23 is a diagram illustrating the configuration of a microscope system using a one-dimensional scanner camera according to the related art.
Figure 24:
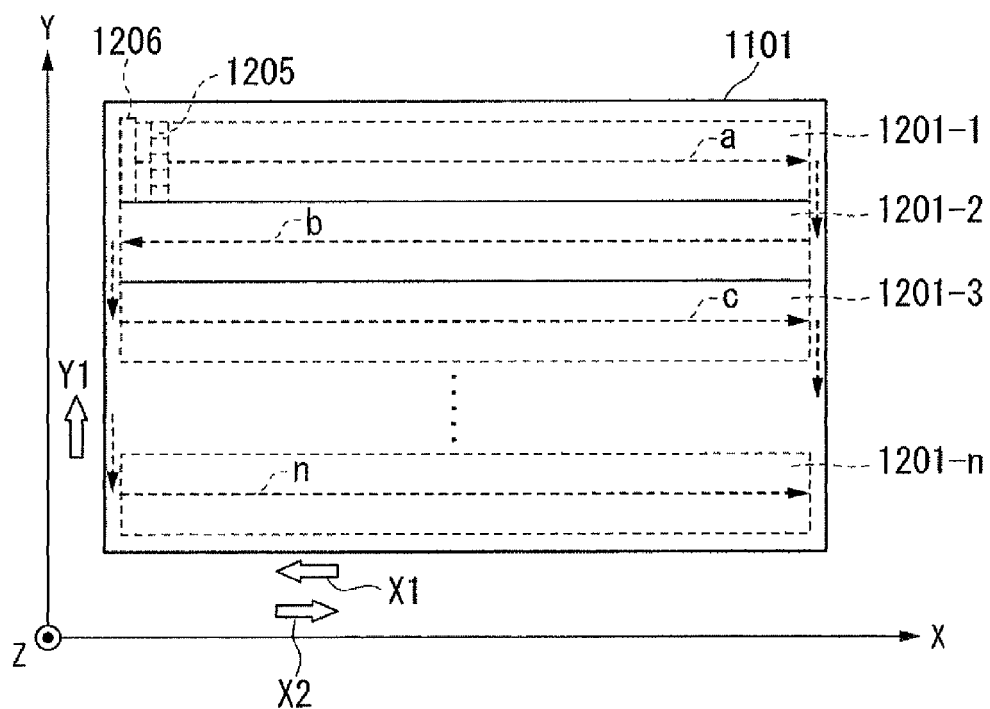
FIG. 24 is a diagram illustrating a trace of a visual field of observation of a line sensor in the microscope system according to the related art.

For example, the stage 102 in the first to sixth embodiments has a conveyer-belt-like configuration, but may have any configuration as long as it can circulate in an endless-track shape. For example, the stage 102 may be configured to circulate in a plane. FIG. 22 is a diagram schematically illustrating a stage 102 circulating in a plane as viewed from the upside of an image-capturing system.

In the example shown in FIG. 22, one glass slide 101 is mounted on the stage 102. FIG. 22 shows the visual field of observation 1031 of the line sensor 103 as an area from which the image data is acquired by the line sensor 103 and the position at which the optical system 104 is disposed.

In FIG. 22, the X-axis direction which is the sub scanning direction of the line sensor 103 is the direction from the left side to the right side of FIG. 22. The Y-axis direction which is the main scanning direction of the line sensor 103 is the direction from the lower side to the upper side of FIG. 22. The direction perpendicular to FIG. 22 is defined as the Z-axis direction. The stage 102 is configured to circulate in the XY plane. The image-capturing system 100 having the stage 102 with this configuration can perform the same operations as those of the first to sixth embodiments.

In the first to sixth embodiments, the imaging driving unit 106 moves the imaging unit 200 in the main scanning direction of the line sensor 103 (in the Y-axis direction) so as to move the position of the visual field of observation 1031 of the line sensor 103, but the invention is not limited to the embodiments. For example, the image-capturing system 100 may include a mechanism that moves the stage 102 in the main scanning direction of the line sensor 103 and this mechanism may move the stage 102 in the main scanning direction of the line sensor 103 so as to move the position of the visual field of observation 1031 of the line sensor 103.

In the image-capturing system according to the invention, since the stage circulates in an endless-track shape, it is not necessary to repeat the stop of the moving stage or the acceleration of the stopped stage at the time of acquiring the image data. Therefore, it is possible to suppress an error from occurring of the image reading position due to the driving state of the stage.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image-capturing system comprising:
a stage that has mounted and fixed thereon a glass slide on which at least one sample is placed and that circulates in an endless-track shape;
a line sensor that scans only a part of the sample;
a moving mechanism that moves a relative position of the line sensor and the stage in a direction perpendicular to a scanning direction of the line sensor; and
an optical system that focuses an image of the sample on the line sensor.

2. The image-capturing system according to claim 1, wherein the stage has a plurality of the glass slides mounted and fixed thereon.

3. The image-capturing system according to claim 2, wherein the stage has a plurality of lines of the glass slides mounted and fixed thereon in the scanning direction of the line sensor.

4. The image-capturing system according to claim 1, further comprising a structure having information on the time for moving a relative position of the line sensor and the stage.

5. The image-capturing system according to claim 4, further comprising an image processing unit that acquires the information on the time for moving the relative position of the line sensor and the stage from image data obtained by causing the line sensor to capture an image of the structure having the information on the time.

6. The image-capturing system according to claim 4, further comprising a sensor that acquires the information on the time for moving the relative position of the line sensor and the stage from the structure having the information on the time.

7. The image-capturing system according to claim 1, further comprising:
a structure having information on an area of the stage which is not scanned by the line sensor; and
an image processing unit that acquires the information on the area of the stage which is not scanned by the line sensor from image data obtained by causing the line sensor to capture an image of the structure having the information on the area of the stage which is not scanned by the line sensor,
wherein the circulation speed of the stage is enhanced when the line sensor passes through the area of the stage which is not scanned by the line sensor.

* * * * *